US012633744B2

(12) United States Patent
Ma et al.

(10) Patent No.: US 12,633,744 B2
(45) Date of Patent: May 19, 2026

(54) METHOD AND SYSTEM FOR TRACKING THE OSCILLATION PATH OF A DIRECT DRIVE WIND FARM

(71) Applicant: NORTH CHINA ELECTRIC POWER UNIVERSITY, Beijing (CN)

(72) Inventors: Jing Ma, Beijing (CN); Xi Shi, Beijing (CN); Yaqi Shen, Beijing (CN); Yawen Deng, Beijing (CN)

(73) Assignees: SHANGHAI UNIVERSITY OF ELECTRIC POWER, Shanghai (CN); STATE GRID SHANGHAI MUNICIPAL ELECTRIC POWER COMPANY, Shanghai (CN); NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/769,242

(22) Filed: Jul. 10, 2024

(65) Prior Publication Data

US 2025/0174996 A1     May 29, 2025

(30) Foreign Application Priority Data

Nov. 23, 2023    (CN) .......................... 202311572498.4

(51) Int. Cl.
| | |
|---|---|
| *H02J 3/0014* | (2026.01) |
| *F03D 7/02* | (2006.01) |
| *F03D 7/04* | (2006.01) |
| *H02J 3/38* | (2006.01) |
| *F03D 9/25* | (2016.01) |
| *H02J 101/28* | (2026.01) |
| *H02J 103/30* | (2026.01) |
| *H02J 103/35* | (2026.01) |

(52) U.S. Cl.
CPC .......... *H02J 3/0014* (2026.01); *F03D 7/0272* (2013.01); *F03D 7/048* (2013.01); *H02J 3/381* (2013.01); *F03D 9/255* (2017.02); *H02J 2101/28* (2026.01); *H02J 2103/30* (2026.01); *H02J 2103/35* (2026.01)

(58) Field of Classification Search
CPC .......... H02J 3/24; H02J 3/381; H02J 2203/10; H02J 2203/20; H02J 2300/28; F03D 7/0272; F03D 7/048; F03D 9/255; F03D 17/00; Y02E 10/76; G06Q 50/06
USPC ....................................................... 307/102
See application file for complete search history.

(56) References Cited

U.S. PATENT DOCUMENTS

2021/0033650 A1*    2/2021  Ma ........................ G01R 21/133

* cited by examiner

*Primary Examiner* — Richard Tan
(74) *Attorney, Agent, or Firm* — Syncoda LLC; Feng Ma

(57) ABSTRACT

A method and system for tracking the oscillation path of a direct drive wind farm involve: collecting the port current, the current and state variables of the current inner loop, the dynamic angle and state component of the phase-locked loop and the phase and amplitude of the fault point voltage of each wind turbine generator in a dominant oscillation mode period which is used as acquisition period, and then obtaining corresponding instantaneous value of each oscillation component of the direct drive wind turbine generator; obtaining energy flow of coupling energy transfer path of direct drive wind farm in each acquisition period based on the instantaneous value; tracking the key energy transfer path of the direct drive wind farm according to the energy flow, so as to realize the stability control of the direct drive wind farm.

10 Claims, 13 Drawing Sheets when the direct drive wind farm failing, collecting a port current, current and state variables of a current inner loop, dynamic angle and state component of a phase-locked loop, and phase and amplitude of a fault point voltage in an acquisition period which is used as a dominant oscillation mode period, and then obtaining a corresponding instantaneous value of each oscillation component of the direct drive wind farm obtaining a energy flow of a coupling energy transfer path of the direct drive wind farm in each acquisition period based on the instantaneous value of each oscillation component collected in each acquisition period tracking a key energy transfer path of the direct drive wind farm according to the energy flow of the coupling energy transfer path of the direct drive wind farm in each acquisition period, so as to realize stability control of the direct drive wind farm

FIG. 1

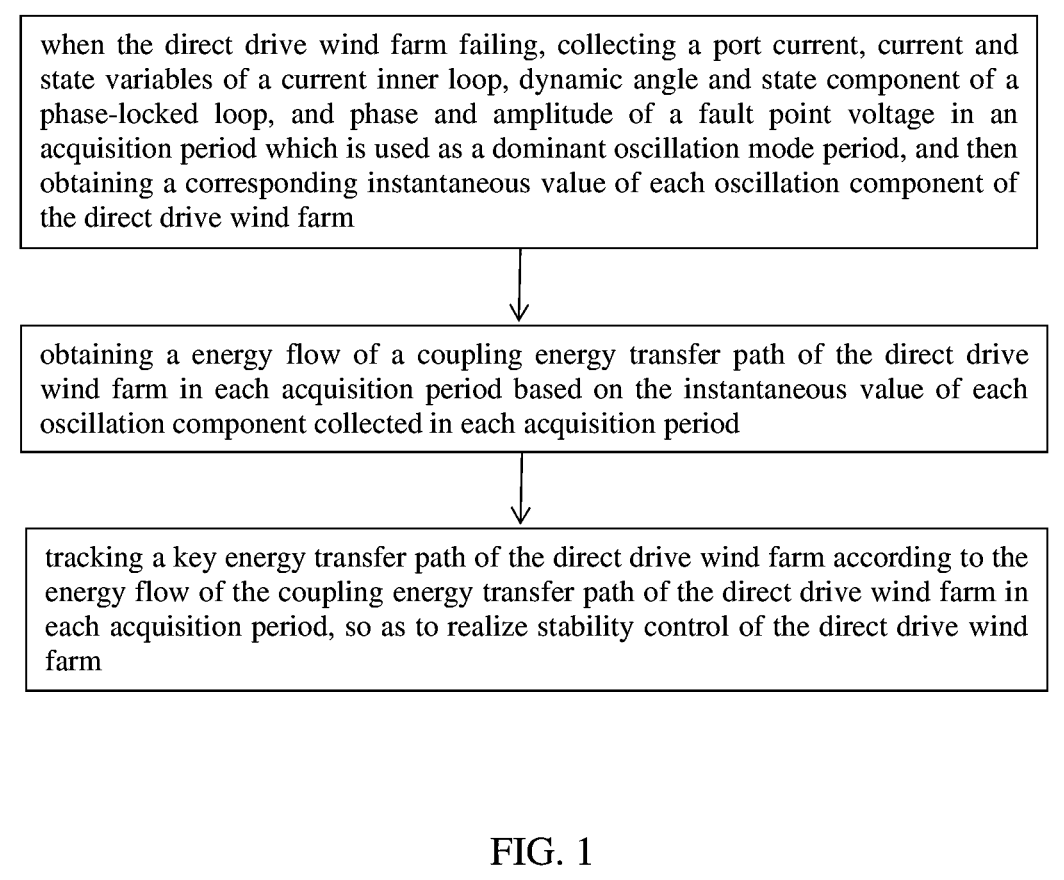

METHOD AND SYSTEM FOR TRACKING THE OSCILLATION PATH OF A DIRECT DRIVE WIND FARM

CROSS-REFERENCE TO RELATED APPLICATIONS

This application claims priority to Chinese Patent Application No. 202311572498.4, filed on Nov. 23, 2023, which is hereby incorporated by reference in its entirety.

TECHNICAL FIELD

The application relates to the technical field of wind power generation system, in particular to a direct drive wind farm oscillation path tracking method and system.

BACKGROUND

With the increase of grid-connected capacity of large-scale direct drive wind farms, the dynamic characteristics of the power system have changed greatly, and the interaction between multiple control links of direct drive wind farms may lead to oscillations after the system is disturbed, and even cause system-level accidents. Therefore, it is very important to clarify the interaction modes within the wind farm or between the wind farm and the power grid, reveal the influence mechanism of each interaction on the oscillation instability of the system, and determine the key energy transfer path that induces the oscillation of the system, so as to reduce the impact of the grid-connected system of the direct drive wind farm.

At present, the analysis methods for the sub/super-synchronous oscillation problem of direct drive wind farms mainly rely on linearized small signal models. However, due to the dynamic change of the operating equilibrium point of the system, the key energy transfer path of the grid-connected system of direct drive wind farms cannot be accurately and effectively tracked, which has an impact on the stability assessment. The conclusions obtained are not of general guiding significance.

SUMMARY

In view of the above analysis, the embodiment of the application aims to provide a method and system for tracking the oscillation path of a direct drive wind farm, so as to solve the problem that the key energy transfer path of a direct drive wind farm grid-connected system cannot be accurately and effectively tracked in the prior art.

In one aspect, the application provides a method for tracking the oscillation path of a direct drive wind farm, including the following steps:

when a direct drive wind farm fails, the dominant oscillation mode period is used as the acquisition period to collect the port current, current and state variables of the current inner loop, the dynamic angle and state component of the phase-locked loop, and the phase and amplitude of the fault point voltage, and then the corresponding instantaneous value of each oscillation component of the direct drive wind farm is obtained;

based on the instantaneous value of each oscillation component collected in each acquisition period, the energy flow of the coupling energy transfer path of the direct drive wind farm in each acquisition period is obtained;

according to the energy flow of the coupling energy transfer path of the direct drive wind farm in each acquisition period, the key energy transfer path of the direct drive wind farm is tracked, and then the stability control of the direct drive wind farm is realized.

Further, the energy flow of the coupling energy transfer path between subsystems of the direct drive wind farm in each acquisition period is obtained by the following methods:

based on the instantaneous value of each oscillation component collected in each acquisition period, the dynamic mathematical model of each subsystem of each direct drive wind turbine generator in each acquisition period is established, the subsystems include current loop d axis subsystem, current loop q axis subsystem, grid-connected line d axis subsystem, grid-connected line q axis subsystem, DC voltage outer loop subsystem and phase-locked loop subsystem;

according to the dynamic mathematical model of each subsystem of each direct drive wind turbine generator in each acquisition period, the dynamic coupling energy derivative of each subsystem of each direct drive wind turbine generator is obtained, and the dynamic coupling energy derivative of each generator in each acquisition period is obtained, the corresponding value is used as the energy flow of the dynamic coupling energy transfer path of each generator in each acquisition period;

the energy flow of the dynamic coupling energy transfer path of each generator in each acquisition period is divided to obtain the energy flow of the generator internal coupling path, the generator-generator coupling path and the generator-grid coupling path, then the energy flow of the generator internal coupling path, the generator-generator coupling path and the generator-grid coupling path is divided respectively to obtain the energy flow of each coupling energy transfer path of the direct drive wind farm in each acquisition period.

Further, the key energy transfer paths of direct drive wind farms are tracked by:

based on the set time interval, the energy flow of the last acquisition period of each coupling energy transfer path of the DCD wind farm in this time interval is subtracted from the energy flow of the first acquisition period, and the energy flow variation of each coupling energy transfer path of the direct drive wind farm in this time interval is obtained;

based on the energy flow variation of each coupling energy transfer path of a direct drive wind farm in the set time interval, the coupling energy transfer paths with the largest energy flow variation in the energy flow of the generator internal coupling path, the generator-generator coupling path and the generator-grid coupling path are obtained respectively, and the obtained coupling energy transfer paths are taken as the key energy transfer paths of the direct drive wind farm in the time interval.

Further, the energy flows of each coupling energy transfer path obtained by dividing the generator internal coupling path are as follows:

$$
\begin{cases}
V_{hi1} = i_{drefi}u_{kdi}^c \cos \Delta\theta_i \\
V_{hi2} = -i_{drefi}u_{kqi}^c \sin \Delta\theta_i \\
V_{hi3} = -(L_{xi} + 2L_T)\left( \dfrac{di_{fdi}^c \cos \Delta\theta_i}{dt} i_{fdi}^c \cos \Delta\theta_i + \dfrac{di_{fdi}^c \sin \Delta\theta_i}{dt} i_{fdi}^c \sin \Delta\theta_i \right) + \\
\left[ R_{xi}i_{fdi}^c \sin \Delta\theta_i + \omega_0(L_{xi} + L_T)i_{fdi}^c \cos \Delta\theta_i + (L_{xi} + L_T)\dfrac{di_{fdi}^c \sin \Delta\theta_i}{dt} \right]X_{\theta i} \\
V_{hi4} = -(L_{xi} + 2L_T)\left( \dfrac{di_{fqi}^c \cos \Delta\theta_i}{dt} i_{fqi}^c \cos \Delta\theta_i + \dfrac{di_{fqi}^c \sin \Delta\theta_i}{dt} i_{fqi}^c \sin \Delta\theta_i \right) + \\
\left[ R_{xi}i_{fqi}^c \cos \Delta\theta_i - \omega_0(L_{xi} + L_T)i_{fqi}^c \sin \Delta\theta_i + (L_{xi} + L_T)\dfrac{di_{fqi}^c \cos \Delta\theta_i}{dt} \right]X_{\theta i} \\
V_{hi5} = -(L_{xi} + 2L_T)\left( -\dfrac{di_{fdi}^c \cos \Delta\theta_i}{dt} i_{fqi}^c \sin \Delta\theta_i - \dfrac{di_{fqi}^c \sin \Delta\theta_i}{dt} i_{fdi}^c \cos \Delta\theta_i + \right. \\
\left. \dfrac{di_{fqi}^c \cos \Delta\theta_i}{dt} i_{fdi}^c \sin \Delta\theta_i + \dfrac{di_{fdi}^c \sin \Delta\theta_i}{dt} i_{fqi}^c \cos \Delta\theta_i \right)
\end{cases}
$$

where $V_{hi1}$ represents the energy flow of energy transfer path of the DC voltage outer loop, current loop d axis, and PLL of the i-th wind turbine generator; $V_{hi2}$ represents the energy flow of energy transfer path of DC voltage outer loop, current loop q axis, and PLL of the i-th wind turbine generator; $V_{hi3}$ represents the energy flow of energy transfer path of current loop d axis and PLL of the i-th wind turbine generator; $V_{hi4}$ represents the energy flow of the energy transfer path of current loop q axis of the i-th wind turbine generator, and the phase locked loop of the i-th wind turbine generator; and $V_{hi5}$ represents the energy flow of energy transfer path of the current loop d axis and q axis of the i-th wind turbine generator and the phase locked loop of the i-th wind turbine generator; $i_{drefi}$ is the d-axis current reference value of the current inner loop of the i-th wind turbine generator, $u_{kdi}^c$ and $$u_{kqi}^c$$

are respectively the d and q axis components of the state variable of current inner loop of the i-th wind turbine generator under the d-q coordinate system of the control system, $\Delta\theta_i$ is the dynamic angle of the phase locked loop of the i-th wind turbine generator, $R_{xi}$ and $L_{xi}$ are respectively the resistance and inductance of the grid-connected line of the i-th wind turbine generator, $$i_{fdi}^c$$

and $$i_{fqi}^c$$

are the d and q axis components of the output current of the i-th wind turbine generator under the d-q coordinate system of the control system, $L_T$ is the inductance of the transformer at the grid-connected bus bar outlet, $\omega_0$ is the grid synchronous angular frequency, and $X_{\theta i}$ is the state variable of phase locked loop of the i-th wind turbine generator.

Further, the energy flows of each coupling energy transfer path obtained by dividing the generator-generator coupling path are as follows:

$$
\begin{cases}
V_{ij1} = \omega_0 L_T i_{fdj}^c \cos \Delta\theta_j X_{\theta i} + L_T \dfrac{di_{fdj}^c \sin \Delta\theta_j}{dt} X_{\theta i} \\
V_{ij2} = -\omega_0 L_T i_{fqj}^c \sin \Delta\theta_j + L_T \dfrac{di_{fqj}^c \cos \Delta\theta_j}{dt} X_{\theta i} \\
V_{ij3} = \omega_0 L_T i_{fdi}^c \cos \Delta\theta_i X_{\theta j} + L_T \dfrac{di_{fdi}^c \sin \Delta\theta_i}{dt} X_{\theta j} \\
V_{ij4} = \omega_0 L_T i_{fqi}^c \sin \Delta\theta_i X_{\theta j} + L_T \dfrac{di_{fqi}^c \cos \Delta\theta_i}{dt} X_{\theta j} \\
V_{ij5} = -2L_T\left( \dfrac{di_{fdj}^c \cos \Delta\theta_j}{dt} i_{fdi}^c \cos \Delta\theta_i + \dfrac{di_{fdj}^c \sin \Delta\theta_j}{dt} i_{fdi}^c \sin \Delta\theta_i + \right. \\
\left. \dfrac{di_{fdi}^c \cos \Delta\theta_i}{dt} i_{fdj}^c \cos \Delta\theta_j + \dfrac{di_{fdi}^c \sin \Delta\theta_i}{dt} i_{fdj}^c \sin \Delta\theta_j \right) \\
V_{ij6} = -2L_T\left( -\dfrac{di_{fqj}^c \sin \Delta\theta_j}{dt} i_{fdi}^c \cos \Delta\theta_i + \dfrac{di_{fqj}^c \cos \Delta\theta_j}{dt} \right. \\
\left. i_{fdi}^c \sin \Delta\theta_i - \dfrac{di_{fdi}^c \cos \Delta\theta_i}{dt} i_{fqj}^c \sin \Delta\theta_j + \dfrac{di_{fdi}^c \sin \Delta\theta_i}{dt} i_{fqj}^c \cos \Delta\theta_j \right) \\
V_{ij7} = -2L_T\left( -\dfrac{di_{fdj}^c \cos \Delta\theta_j}{dt} i_{fqi}^c \sin \Delta\theta_i + \dfrac{di_{fdj}^c \sin \Delta\theta_j}{dt} \right. \\
\left. i_{fqi}^c \cos \Delta\theta_i - \dfrac{di_{fqi}^c \sin \Delta\theta_i}{dt} i_{fdj}^c \cos \Delta\theta_j + \dfrac{di_{fqi}^c \cos \Delta\theta_i}{dt} i_{fdj}^c \sin \Delta\theta_j \right) \\
V_{ij8} = -2L_T\left( \dfrac{di_{fqj}^c \sin \Delta\theta_j}{dt} i_{fqi}^c \sin \Delta\theta_i + \dfrac{di_{fqj}^c \cos \Delta\theta_j}{dt} i_{fqi}^c \cos \Delta\theta_i + \right. \\
\left. \dfrac{di_{fqi}^c \sin \Delta\theta_i}{dt} i_{fqj}^c \sin \Delta\theta_j + \dfrac{di_{fqi}^c \cos \Delta\theta_i}{dt} i_{fqj}^c \cos \Delta\theta_j \right)
\end{cases}
$$

where $V_{ij1}$ represents energy flow of the energy transfer path of phase locked loop of the i-th wind turbine generator, the current loop d axis of the i-th wind turbine generator, and the phase locked loop of the j-th wind turbine generator; $V_{ij2}$ represents the energy flow of the energy transfer path of phase locked loop of the i-th wind turbine generator, the current loop q axis of the j-th wind turbine generator, and the phase locked loop of the j-th wind turbine generator; $V_{ij3}$ represents the energy flow of the energy transfer path of the current loop d axis of the i-th wind turbine generator, the phase locked loop of the i-th wind turbine generator, and the phase locked loop of the j-th wind turbine generator; $V_{ij4}$ represents the energy flow of the energy transfer path of the current loop q axis of the i-th wind turbine generator, the phase locked loop of the i-th wind turbine generator, and the phase locked loop of the j-th wind turbine generator; $V_{ij5}$ represents the energy flow of the energy transfer path of the current loop d axis of the i-th wind turbine generator, the phase locked loop of the i-th wind turbine generator, the current loop d axis of the j-th wind turbine generator, and the phase locked loop of the j-th wind turbine generator; $V_{ij6}$ represents the energy flow of the energy transfer path of the current loop d axis of the i-th wind turbine generator, the phase locked loop of the i-th wind turbine generator, the current loop q axis of the j-th wind turbine generator, and phase locked loop of the j-th wind turbine generator; $V_{ij7}$ represents the energy flow of the energy transfer path of the current loop q axis of the i-th wind turbine generator, the phase locked loop of the i-th wind turbine generator, the current loop d axis of the j-th wind turbine generator, and phase locked loop of the j-th wind turbine generator; $V_{ij8}$ represents the energy flow of the energy transfer path of the current loop q axis of the i-th wind turbine generator, the phase locked loop of the i-th wind turbine generator, the current loop q axis of the j-th wind turbine generator, and the phase locked loop of the j-th wind turbine generator; $\Delta\theta_j$ is the dynamic angle of the phase locked loop of the j-th wind turbine generator;

$$i^c_{fdj}$$

and $$i^c_{fqj}$$

are respectively the d and q axis components of the output current of the j-th wind turbine generator under the d-q coordinate system of the control system; $X_{\theta j}$ is state variable of the phase locked loop of the j-th wind turbine generator.

Further, the energy flows of each coupling energy transfer path obtained by dividing the generator-grid coupling paths are as follows:

$$
\begin{cases}
V_{gi1} = -2u_{md}i^c_{fdi}\cos\Delta\theta_i \\
V_{gi2} = -2u_{mq}i^c_{fdi}\sin\Delta\theta_i \\
V_{gi3} = 2u_{md}i^c_{fqi}\sin\Delta\theta_i \\
V_{gi4} = -2u_{mq}i^c_{fqi}\cos\Delta\theta_i \\
V_{gi5} = u_{mq}X_{\theta i}
\end{cases}
$$

where $V_{gi1}$ represents the energy flow of the energy transfer path of the current loop d axis of the i-th wind turbine generator, the phase locked loop of the i-th wind turbine generator, and the d axis of the grid; $V_{gi2}$ represents the energy flow of the energy transfer path of the current loop d axis of the i-th wind turbine generator, the phase locked loop of the i-th wind turbine generator, and the q axis of the grid; $V_{gi3}$ represents the energy flow of the energy transfer path of the current loop q axis of the i-th wind turbine generator, the phase locked loop of the i-th wind turbine generator, and the d axis of the power grid; $V_{gi4}$ represents the energy flow of the energy transfer path of the current loop q axis of the i-th wind turbine generator, the phase locked loop of the i-th wind turbine generator, and the q axis of the grid; $V_{gi5}$ represents the energy flow of the energy transfer path of the phase locked loop of the i-th wind turbine generator and the q axis of the grid; $u_{md}$ and $u_{mq}$ represent the d and q axis components of the fault point voltage respectively.

Further, the dominant oscillation mode period is $$\frac{2\pi}{\omega_c};$$

Where, $\omega_c$ represents the oscillation frequency of the dominant oscillation mode of the system.

Further, the instantaneous value of each oscillation component of the direct drive wind turbine generator is expressed as:

$$
\begin{cases}
i^c_{fdi} = A_{di}e^{\alpha t}\sin(\omega_c t + \varphi_{di}) \\
i^c_{fqi} = A_{qi}e^{\alpha t}\sin(\omega_c t + \varphi_{qi})
\end{cases}
$$

-continued $$i_{drefi} = A_{drefi}e^{\alpha t}\sin(\omega_c t + \varphi_{drefi})$$

$$u^c_{kdi} = A_{ukdi}e^{\alpha t}\sin(\omega_c t + \varphi_{ukdi})$$

$$\Delta\theta_i = A_{\theta i}e^{\alpha t}\sin(\omega_c t + \varphi_{\theta i})$$

$$X_{\theta i} = A_{x\theta i}e^{\alpha t}\sin(\omega_c t + \varphi_{x\theta i})$$

$$
\begin{cases}
u_{md} = A_{md}e^{\alpha t}\sin(\omega_c t + \varphi_{md}) \\
u_{mq} = A_{mq}e^{\alpha t}\sin(\omega_c t + \varphi_{mq})
\end{cases}
$$

where, $A_{di}$ and $A_{qi}$ respectively represent the amplitude of d and q axis components of the output current of the i-th wind turbine generator, $\alpha$ represents the damping coefficient of the system, $\omega_c$ represents the oscillation frequency under the d-q coordinate system of the control system, $\varphi_{di}$ and $\varphi_{qi}$ represent the phases of d and q components of the output current of the i-th wind turbine generator, and $A_{drefi}$ represents the amplitude of the d-axis current reference value of the current inner loop of the i-th wind turbine generator, $\varphi_{drefi}$ is the phase of the d-axis current reference value of the current inner loop of the i-th wind turbine generator, $A_{ukdi}$ is the amplitude of the d-axis component of state variable of the current inner loop of the i-th wind turbine generator, $\varphi_{ukdi}$ is the phase of the d-axis component of state variable of the current inner loop of the i-th wind turbine generator, $A_{\theta i}$ is the amplitude of the dynamic angle of the phase locked loop of the i-th wind turbine generator, $\varphi_{\theta i}$ is the phase of the dynamic angle of the phase locked loop of the i-th wind turbine generator, $A_{x\theta i}$ is the amplitude of state variable of the PLL of the i-th wind turbine generator, $\varphi_{x\theta i}$ is the phase of state variable of the PLL of the i-th wind turbine generator, $A_{md}$ and $A_{mq}$ are the amplitudes of the d and q axis components of the fault point voltage respectively, and $\varphi_{md}$ and $\varphi_{mq}$ are the phases of the d and q axis components of the fault point voltage respectively.

In a further aspect, the application provides a system for tracking oscillation path of a direct drive wind farm, includes:

the data acquisition module, which is used to collect the port current, the current and state variable of the current inner loop, the dynamic angle and state component of the phase-locked loop and the phase and amplitude of the fault point voltage of each wind turbine generator when a direct drive wind farm fails, and then to obtain the corresponding instantaneous value of each oscillation component of the direct drive wind turbine generator;

the coupling energy transfer path acquisition module, which is used to obtain the energy flow of the coupling energy transfer path of the direct drive wind farm in each acquisition period based on the instantaneous value of each oscillation component collected in each acquisition period;

the key energy transfer path tracking module, which is used to track the key energy transfer path of the direct drive wind farm according to the energy flow of the coupling energy transfer path of the direct drive wind farm in each acquisition period, so as to realize the stability control of the direct drive wind farm.

Further, the coupling energy transfer path acquisition module obtains the energy flow of the coupling energy transfer path between subsystems of the direct drive wind farm in each acquisition period by:

based on the instantaneous value of each oscillation component collected in each acquisition period, the dynamic mathematical model of each subsystem of each direct drive wind turbine generator in each acquisition period is established, the subsystems include current loop d, q axis subsystems, grid-connected line d, q axis subsystems, DC voltage outer loop subsystem and phase-locked loop subsystem;

according to the dynamic mathematical model of each subsystem of each direct drive wind turbine generator in each acquisition period, the dynamic coupling energy derivative of each subsystem of each direct drive wind turbine generator is obtained, and the dynamic coupling energy derivative of each generator in each acquisition period is obtained, the corresponding value is used as the energy flow of the dynamic coupling energy transfer path of each generator in each acquisition period;

the energy flow of the dynamic coupling energy transfer path of each generator in each acquisition period is divided to obtain the energy flow of the generator internal coupling path, the generator-generator coupling path and the generator-grid coupling path. Then the energy flow of the generator internal coupling path, the generator-generator coupling path and the generator-grid coupling path is divided respectively to obtain the energy flow of each coupling energy transfer path of the direct drive wind farm in each acquisition period.

Compared with the prior art, the application has the following beneficial effects:

The application provides a method and system for tracking the oscillation path of a direct drive wind farm. When the direct drive wind farm fails, the data is collected by taking the dominant oscillation mode period as the acquisition period to obtain the corresponding instantaneous value of each oscillation component, and the energy flow of the coupling energy transfer path between the subsystems of the direct drive wind farm with each acquisition period is obtained. Then, the key energy transfer path of the direct drive wind farm in each acquisition period is tracked to achieve accurate and effective tracking of the key energy transfer path of the grid-connected system of the direct drive wind farm, and guiding suggestions are given for the stable and safe operation of the power system. And by dividing the whole wind turbine generator into multiple subsystems, the key control links that affect the stability level of the system are selected out. The coupling energy transfer paths obtained by dynamic coupling energy derivatives reduce the calculation amount, improve the calculation accuracy and ensure the reliable operation of the system.

In this application, the above technical schemes can also be combined with each other to realize more optimal combination schemes. Other characteristics and advantages of the present application will be described in a subsequent specification, and some of the advantages may become apparent from the specification or may be understood through the implementation of the present application. The purpose and other advantages of the application may be realized and obtained through the contents specifically indicated in the specification and the appended drawings.

BRIEF DESCRIPTION OF THE DRAWINGS

The appended drawings are used only for the purpose of showing specific embodiments and are not considered to be a limitation of the present application. Throughout the appended drawings, the same reference symbols represent the same components.

FIG. 1 is a flow diagram of the direct drive wind farm oscillation path tracking method provided in example 1 of the application;

DETAILED DESCRIPTION

Figure 2:
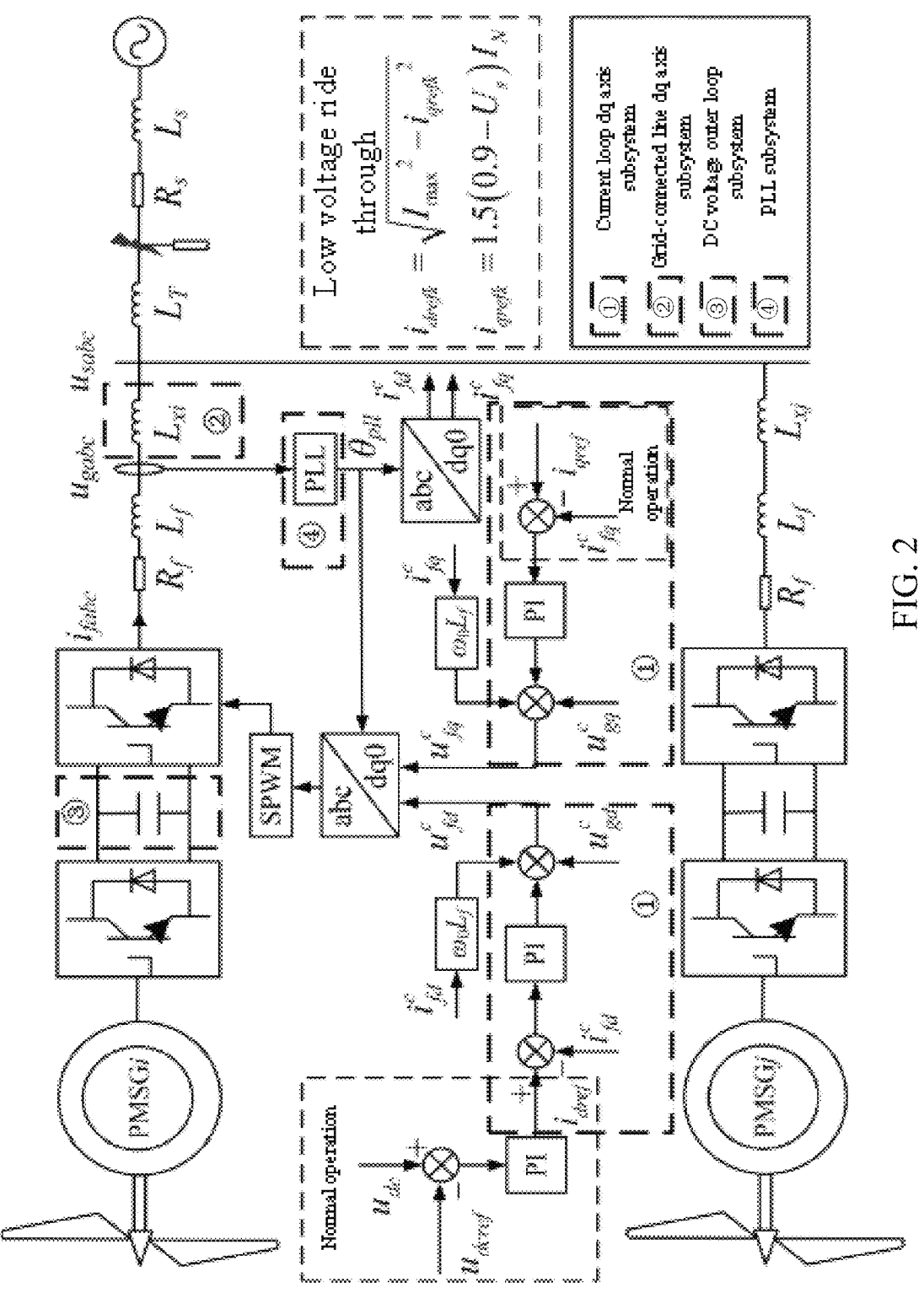
FIG. 2 is a structural diagram of the grid-connected system of the direct drive wind farm provided in example 1 of the application.

The proposed method is described in detail below in conjunction with the diagrams in the appendix. It should be emphasized that the following description is only exemplary and is not intended to limit the scope of this invention and its application.

Example 1

A specific embodiment of the application discloses a method for tracking the oscillation path of a direct drive wind farm, as shown in FIG. 1, including the following steps:

S1: When a direct drive wind farm fails, the dominant oscillation mode period is taken as the acquisition period to collect the port current, current and state variables in the current inner loop, dynamic angle and state component of phase locked loop, and the phase and amplitude of the fault point voltage of each wind turbine generator, and then the corresponding instantaneous value of each oscillation component of the direct drive wind turbine generator is obtained.

When implemented, the instantaneous value of each oscillation component of the direct drive wind turbine generator is expressed as:

$$\begin{cases} i_{fdi}^c = A_{di}e^{\alpha t}\sin(\omega_c t + \varphi_{di}) \\ i_{fqi}^c = A_{qi}e^{\alpha t}\sin(\omega_c t + \varphi_{qi}) \end{cases}$$

$$i_{drefi} = A_{drefi}e^{\alpha t}\sin(\omega_c t + \varphi_{drefi})$$

$$u_{kdi}^c = A_{ukdi}e^{\alpha t}\sin(\omega_c t + \varphi_{ukdi})$$

$$\Delta\theta_i = A_{\theta i}e^{\alpha t}\sin(\omega_c t + \varphi_{\theta i})$$

$$X_{\theta i} = A_{x\theta i}e^{\alpha t}\sin(\omega_c t + \varphi_{x\theta i})$$

$$\begin{cases} u_{md} = A_{md}e^{\alpha t}\sin(\omega_c t + \varphi_{md}) \\ u_{mq} = A_{mq}e^{\alpha t}\sin(\omega_c t + \varphi_{mq}) \end{cases}$$

where, $$i_{fdi}^c$$

and $$i_{fqi}^c$$

are respectively the d and q axis components of the output current of the i-th wind turbine generator under the d-q coordinate system of the control system; $A_{di}$ and $A_{qi}$ are respectively the amplitudes of the d and q axis components of the output current of the i-th wind turbine generator; $\alpha$ is the system damping coefficient; $\omega_c$ is the oscillation frequency under the d-q coordinate system of the control system; $\varphi_{di}$ and $\varphi_{qi}$ are respectively the phases of the d and q components of the output current of the i-th wind turbine generator; $i_{drefi}$ is the d-axis current reference value of the current inner loop of the i-th wind turbine generator, $A_{drefi}$ is the amplitude of the d-axis current reference value of the current inner loop of the i-th wind turbine generator, $\varphi_{drefi}$ is the phase of the d axis current reference value of the current inner loop of the i-th wind turbine generator, and $$u_{kdi}^c$$

is the d axis component of the state variable of the current inner loop of the i-th wind turbine generator under the d-q coordinate system of the control system; $A_{ukdi}$ is the amplitude of the d-axis component of the state variable of the current internal loop of the i-th wind turbine generator, $\varphi_{ukdi}$ is the phase of the d-axis component of the state variable of the current internal loop of the i-th wind turbine generator, $\Delta\theta_i$ is the dynamic angle of the phase locked loop of the i-th wind turbine generator, $A_{\theta i}$ is the amplitude of the dynamic angle of the phase locked loop of the i-th wind turbine generator, $\varphi_{\theta i}$ is the phase of the dynamic angle of the phase locked loop of the i-th wind turbine generator, and $X_{\theta i}$ is the state variable of the phase locked loop of the i-th wind turbine generator. $A_{x\theta i}$ is the amplitude of the state variable of the phase locked loop of the i-th wind turbine generator, $\varphi_{x\theta i}$ is the phase of the state variable of the phase locked loop of the i-th wind turbine generator, $u_{md}$ and $u_{mq}$ are respectively the d and q axis components of the fault point voltage, $A_{md}$ and $A_{mq}$ are respectively the amplitudes of the d and q axis components of the fault point voltage, $\varphi_{md}$ and $\varphi_{mq}$ are respectively the phases of the d and q axis components of the fault point voltage. It should be noted that the parameter superscript "c" represents the variable under the d-q coordinate system of the control system, the absence of superscript "c" represents the variable under the d-q coordinate system of the power grid, and the subscript "i" represents the i-th wind turbine generator.

Specifically, data are collected by PMU devices installed on the ports of each wind turbine generator in a direct drive wind farm.

More specifically, the dominant oscillation mode period is $$\frac{2\pi}{\omega_c};$$

where, $\omega_c$ represents the oscillation frequency of the dominant oscillation mode of the system.

S2: Based on the instantaneous value of each oscillation component collected in each acquisition period, the energy flow of the coupling energy transfer path of the direct drive wind farm in each acquisition period is obtained.

When implemented, the energy flow of the coupling energy transfer path between subsystems of the direct drive wind farm in each acquisition period is obtained by the following ways:

S21: Based on the instantaneous value of each oscillation component collected in each acquisition period, the dynamic mathematical model of each subsystem of each direct drive wind turbine generator in the direct drive wind farm in each acquisition period is established; the subsystems include current loop d and q axis subsystems, grid-connected line d and q axis subsystems, DC voltage outer loop subsystem and phase-locked loop subsystem.

Specifically, as shown in FIG. 2, each direct drive wind turbine is divided into 6 subsystems according to each control link, which are current loop d, q axes subsystems, grid-connected line d, q axes subsystems, DC voltage outer loop subsystem and phase-locked loop subsystem. The dynamic mathematical models of each subsystem are as follows:

The dynamic mathematical models of the current loop d and q axis subsystems are respectively:

$$\begin{cases} \dfrac{1}{k_{Ii}} \dfrac{du_{kdi}}{dt} = -i_{fdi} + i_{drefi} \\ L_f \dfrac{di_{fdi}}{dt} = -(k_{Pi} + R_f)i_{fdi} + u_{kdi} + k_{Pi}i_{drefi} + \omega_0 L_f i_{fqi} - u_{gdi} \end{cases}$$

$$\begin{cases} \dfrac{1}{k_{Ii}} \dfrac{du_{kqi}}{dt} = -i_{fqi} + i_{qrefi} \\ L_f \dfrac{di_{fqi}}{dt} = -(k_{Pi} + R_f)i_{fqi} + u_{kqi} + k_{Pi}i_{qrefi} - \omega_0 L_f i_{fdi} - u_{gqi} \end{cases}$$

where, $k_{Pi}$ and $k_{Ii}$ are the proportion and integral coefficient of the inner current loop of the i-th wind turbine generator; $R_f$ and $L_f$ are the resistance and inductance of the filtering link respectively; $i_{fdi}$ and $i_{fqi}$ are the d and q axis components of the output current of the i-th wind turbine generator respectively; $u_{kdi}$ and $u_{kqi}$ are the d and q axis components of the state variable of the inner current loop of the i-th wind turbine generator respectively. $i_{drefi}$ and $i_{qrefi}$ are respectively the d and q axis current reference values of the current inner loop of the i-th wind turbine generator, $\omega_0$ is the synchronous angular frequency of the grid, and $u_{gdi}$ and $u_{gqi}$ are respectively the d and q axis components of the PLL sampling point voltage of the i-th wind turbine generator. The sampling point is a bus bar located at the wind turbine port.

The dynamic mathematical models of grid-connected line d and q axis subsystems are as follows:

$$L_{xi} \dfrac{di_{fdi}}{dt} = -R_{xi}i_{fdi} + \omega_0 L_{xi}i_{fqi} + u_{fdi} - u_{sd}$$

$$L_{xi} \dfrac{di_{fqi}}{dt} = -R_{xi}i_{fqi} - \omega_0 L_{xi}i_{fdi} + u_{fqi} - u_{sq}$$

where, $R_{xi}$ and $L_{xi}$ are respectively the resistance and inductance of the grid-connected line of the i-th wind turbine generator, and $u_{sd}$ and $u_{sq}$ are respectively the d and q axis components of the system PCC point voltage.

The dynamic mathematical model of the DC voltage outer loop subsystem is as follows:

$$C_f u_{dci} \dfrac{du_{dci}}{dt} = -(u_{fdi}i_{fdi} + u_{fqi}i_{fqi}) + P_m$$

where, $C_f$ is the DC capacitance, $u_{dci}$ is the DC capacitance voltage of the i-th wind turbine generator, $u_{fdi}$ and $u_{fqi}$ are the d and q axis components of the terminal voltage of the i-th wind turbine generator respectively, and $P_m$ is the mechanical power transmitted by the converter at the side of the generator.

The dynamic mathematical model of the phase-locked loop subsystem is:

$$\begin{cases} \dfrac{1}{k_{I\theta i}} \dfrac{dX_{\theta i}}{dt} = u_{gqi} \\ \dfrac{d\theta_{plli}}{dt} = X_{\theta i} + \omega_0 + k_{P\theta i}u_{gqi} \end{cases}$$

where, $k_{P\theta i}$ and $k_{I\theta i}$ are the proportion and integral coefficient of the phase locked loop of the i-th wind turbine generator respectively, and $\theta_{plli}$ is the output phase locked angle of the i-th wind turbine generator.

S22: According to the dynamic mathematical model of each subsystem of each direct drive wind turbine generator in the direct drive wind farm in each acquisition period, the dynamic coupling energy derivative of each subsystem of each direct drive wind turbine generator is obtained, and the dynamic coupling energy derivative of each generator in each acquisition period is obtained, and the corresponding value is used as the energy flow of the dynamic coupling energy transfer path of each generator in each acquisition period.

Specifically, the dynamic coupling energy derivatives of each subsystem of each direct drive wind turbine generator are:

The dynamic coupling energy derivatives $$W_{zfdi}^{\&}$$

and $$W_{zfqi}^{\&}$$

of the current loop d and q axis subsystems are respectively expressed as:

$$W_{zfdi}^{\&} = i_{drefi}u_{kdi} + (k_{Pi}i_{drefi} + \omega_0 L_f i_{fqi} - u_{gdi})i_{fdi}$$

$$W_{zfqi}^{\&} = i_{qrefi}u_{kqi} + (k_{Pi}i_{qrefi} + \omega_0 L_f i_{fdi} - u_{gqi})i_{fqi}$$

The dynamic coupling energy derivatives $\dot{W}_{zldi}$ and $\dot{W}_{zlqi}$ of the grid-connected line d and q axis subsystems are respectively expressed as:

$$\dot{W}_{zldi} = (u_{gdi} - u_{sd} + \omega_0 L_{xi}i_{fqi})i_{fdi}$$

$$\dot{W}_{zlqi} = (u_{gqi} - u_{sq} - \omega_0 L_{xi}i_{fdi})i_{fqi}$$

The dynamic coupling energy derivative $\dot{W}_{zdci}$ of the DC voltage outer loop subsystem is expressed as:

$$W_{zdci} = -k_{Pi}i_{drefi}i_{fdi} + k_{Pi}i_{fdi}i_{fdi} - i_{fdi}u_{kdi} -$$
$$u_{gdi}i_{fdi} - k_{Pi}i_{qrefi}i_{fqi} + k_{Pi}i_{fqi}i_{fqi} - i_{fqi}u_{kqi} - u_{gqi}i_{fqi} + P_m$$

The dynamic coupling energy derivative $$W_{z\theta i}^{\&}$$

of the phase-locked loop subsystem is expressed as:

$$W^{\&}_{z\theta i} = u_{gqi} X_{\theta i}$$

Based on this, the dynamic coupling energy derivative $$W^{\&}_{zi}$$

of the i-th wind turbine generator is obtained, that is, the energy flow of the dynamic coupling energy transfer path of the i-th wind turbine generator, expressed as:

$$W^{\&}_{zi} = W^{\&}_{zfdi} + W^{\&}_{zfqi} + W^{\&}_{zldi} + W^{\&}_{zlqi} + W^{\&}_{zdci} + W^{\&}_{z\theta i} =$$

$$(i_{drefi} - i_{fdi})u_{kdi} + (i_{qrefi} - i_{fqi})u_{kqi} + k_{Pi}(i^2_{fdi} + i^2_{fqi}) -$$

$$(u_{gdi} + u_{sd})i_{fdi} - (u_{gqi} + u_{sq})i_{fqi} + u_{gqi}X_{\theta i} + P_m$$

therein, $$u_{gdi} =$$

$$R_{xi}i_{fdi} + L_{xi}\frac{di_{fdi}}{dt} - \omega_0 L_{xi}i_{fqi} + L_T\frac{d(i_{fdi} + i_{fdj})}{dt} - \omega_0 L_T(i_{fqi} + i_{fqj}) + u_{md}$$

$$u_{gqi} =$$

$$R_{xi}i_{fqi} + L_{xi}\frac{di_{fqi}}{dt} + \omega_0 L_{xi}i_{fdi} + L_T\frac{d(i_{fqi} + i_{fqj})}{dt} + \omega_0 L_T(i_{fdi} + i_{fdj}) + u_{mq}$$

Where, $L_T$ represents the inductance of the transformer at the grid-connected bus bar outlet.

It should be noted that the object of the transfer path is determined according to the control link corresponding to the variable contained in the derivative expression, so that the transfer path is represented by the derivative expression, and the specific value of the derivative obtained is the energy flow of the transfer path.

It should be noted that the dynamic coupling energy derivative basis of each subsystem is obtained based on the following analysis:

The dynamic mathematical model of the 6 subsystems can be uniformly expressed as follows:

$$\begin{cases} A\dfrac{dx}{dt} = -Cy + H_x \\ B\dfrac{dy}{dt} = -Dy + Ex + H_y \end{cases}$$

In the formula, A, B, C, D, E, H, and $H_y$ represent coefficients respectively, and x and y are variables respectively.

The first integration method was used to construct the energy function, and the two formulas above were cross-multiplied and integrated to obtain the dynamic energy model corresponding to each subsystem as follows:

$$\frac{1}{2}AEx^2 + \frac{1}{2}BCy^2 + CD\int y^2 dt - C\int H_y y dt - E\int H_x x dt = Const$$

where Const represents the integral constant, $AEx^2/2$ and $BCy^2/2$ correspond to the dynamic storage energy injected into the corresponding control links of x and y in the subsystem after the fault, denoted as $W_s$; $-CD\int y^2 dt$ corresponds to the dynamic dissipated energy injected into the corresponding control link of y in the subsystem after the fault, and is denoted as $W_d$. $C\int H_y y dt$ and $E\int H_x x dt$ correspond to the dynamic coupling energy generated between the corresponding control links of x and y and other control links injected into the subsystem after the fault, and are denoted as $W_z$. It is known that they satisfy $$W^{\&}_s = W^{\&}_d + W^{\&}_z$$

The response process of wind farm after disturbance is essentially a process of energy storage, dissipation and coupling among all links, which follows the law of energy conservation. According to Lyapunov's second law, the state variables of a disturbed system will deviate from the equilibrium point and obtain a certain dynamic storage energy. If the dynamic storage energy gradually decays to the minimum value over time, the system can gradually recover stability in this state. On the contrary, if the dynamic storage energy of the system continues to increase, the system is unstable. The dynamic dissipative energy is always negative, which is conducive to the stability of the system, and the dynamic coupling energy is the direct reason to determine the stability of the system. When the energy derivative is positive, the stored energy continues to increase, and the system stability decreases, and the larger the value, the worse the system stability. Therefore, the variation of the dynamic coupling energy derivative directly reflects the stability of the system.

The expression of the dynamic coupling energy derivative obtained from the above equation is as follow:

$$W^{\&}_z = EH_x x + CH_y y$$

Therefore, the dynamic coupling energy derivative can be obtained according to the dynamic mathematical model of each subsystem of each direct drive wind turbine generator.

S23: The energy flow of the dynamic coupling energy transfer path of each generator in each acquisition period is divided to obtain the energy flow of the generator internal coupling path the generator-generator coupling path and the generator-grid coupling path. Then the energy flow of the generator internal coupling path, the generator-generator coupling path and the generator-grid coupling path is divided respectively to obtain the energy flow of each coupling energy transfer path of the direct drive wind farm in each acquisition period.

Specifically, the generator internal coupling path of each wind turbine generator contains only the relevant variables of the generator. The generator-generator coupling path of each wind turbine generator contains the variables of the wind turbine generator and any other wind turbine generator. The generator-grid coupling path of each wind turbine generator includes the variables of the generator and the power grid.

Therefore, based on the expression of the dynamic coupling energy transfer path $$W^{\&}_{zi}$$

of each generator, the energy flow of the generator internal coupling path, the generator-generator coupling path and the generator-grid coupling path of each turbine generator is obtained, which is expressed as follows:

The energy flow of the generator internal coupling path is:

$$V_{hi} =$$

$$i_{dref}\left(u_{kdi}^c\cos\Delta\theta_i - u_{kqi}^c\sin\Delta\theta_i\right) - i_{fdi}^c u_{kdi}^c - i_{fqi}^c u_{kqi}^c + (k_{Pi} - R_{xi})\left(i_{fdi}^{c2} + i_{fqi}^{c2}\right) -$$

$$(L_{xi} + 2L_T)\left(\begin{array}{c}\dfrac{d\left(i_{fdi}^c\cos\Delta\theta_i - i_{fqi}^c\sin\Delta\theta_i\right)}{dt}\left(i_{fdi}^c\cos\Delta\theta_i - i_{fqi}^c\sin\Delta\theta_i\right) + \\ \dfrac{d\left(i_{fqi}^c\cos\Delta\theta_i + i_{fdi}^c\sin\Delta\theta_i\right)}{dt}\left(i_{fqi}^c\cos\Delta\theta_i + i_{fdi}^c\sin\Delta\theta_i\right)\end{array}\right) +$$

$$\left[\begin{array}{c}R_{xi}\left(i_{fqi}^c\cos\Delta\theta_i + i_{fdi}^c\sin\Delta\theta_i\right) + (L_{xi} + L_T)\dfrac{d\left(i_{fqi}^c\cos\Delta\theta_i + i_{fdi}^c\sin\Delta\theta_i\right)}{dt} + \\ \omega_0(L_{xi} + L_T)\left(i_{fdi}^c\cos\Delta\theta_i - i_{fqi}^c\sin\Delta\theta_i\right)\end{array}\right]X_{\theta i}$$

where, $V_{hi}$ represents the energy flow of the coupling path in the generator.

The energy flow of the generator-generator coupling path is:

$$V_{ti-j} = -2L_T\left[\begin{array}{c}\left(\dfrac{di_{fdj}^c\cos\Delta\theta_j}{dt} - \dfrac{di_{fqj}^c\sin\Delta\theta_j}{dt}\right)\left(i_{fdi}^c\cos\Delta\theta_i - i_{fqi}^c\sin\Delta\theta_i\right) + \\ \left(\dfrac{di_{fqj}^c\cos\Delta\theta_j}{dt} + \dfrac{di_{fdj}^c\sin\Delta\theta_j}{dt}\right)\left(i_{fqi}^c\cos\Delta\theta_i + i_{fdi}^c\sin\Delta\theta_i\right) + \\ +\omega_0\left(i_{fqi}^c\cos\Delta\theta_j - i_{fdj}^c\sin\Delta\theta_j\right)\left(i_{fqi}^c\cos\Delta\theta_i + i_{fdi}^c\sin\Delta\theta_i\right) \\ -\omega_0\left(i_{fdj}^c\cos\Delta\theta_j + i_{fqj}^c\sin\Delta\theta_j\right)\left(i_{fdi}^c\cos\Delta\theta_i - i_{fqi}^c\sin\Delta\theta_i\right)\end{array}\right]$$

$$\left[+L_T\dfrac{d\left(i_{fqj}^c\cos\Delta\theta_j + i_{fdj}^c\sin\Delta\theta_j\right)}{dt} + \omega_0 L\left(i_{fdj}^c\cos\Delta\theta_j - i_{fqj}^c\sin\Delta\theta_j\right)\right]X_{\theta i}$$

where, $V_{ti-j}$ represents the energy flow of the generator-generator coupling path.

The energy flow of the generator-grid coupling path is:

$$V_{gi} = -2u_{md}\left(i_{fdi}^c\cos\Delta\theta_i - i_{fqi}^c\sin\Delta\theta_i\right) - 2u_{mq}\left(i_{fqi}^c\cos\Delta\theta_i + i_{fdi}^c\sin\Delta\theta_i\right) + u_{mq}X_{\theta i}$$

where $V_{gi}$ represents the energy flow of the generator-grid coupling path.

In the same way, the energy flow of the related energy coupling transfer path of the j-th wind turbine generator in the direct drive wind farm can be obtained, i≠j.

Figure 3:
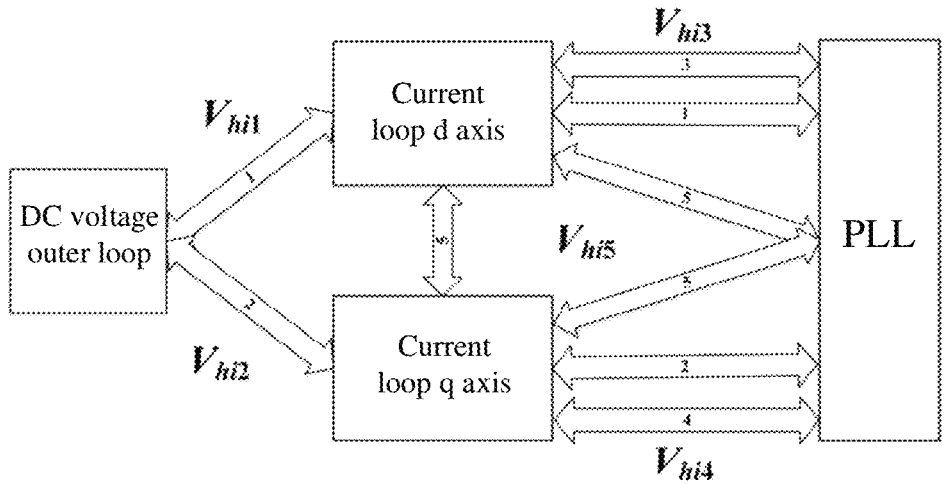
FIG. 3 is a coupling energy transfer path diagram of each subsystem in the direct drive wind turbine generator provided in example 1 of the application.

Specifically, the energy flow of the generator internal coupling path, the generator-generator coupling path and the generator-grid coupling path is divided, and the energy flow of the coupling energy transfer path of the direct drive wind farm in each acquisition period is as follows:

As shown in FIG. 3, the energy flows of each coupling energy transfer path obtained by dividing the generator internal coupling path are as follows:

$$\left\{\begin{array}{l}V_{hi1} = i_{drefi}u_{kdi}^c\cos\Delta\theta_i \\ V_{hi2} = -i_{drefi}u_{kqi}^c\sin\Delta\theta_i \\ V_{hi3} = -(L_{xi} + 2L_T)\left(\dfrac{di_{fdi}^c\cos\Delta\theta_i}{dt}i_{fdi}^c\cos\Delta\theta_i + \dfrac{di_{fdi}^c\sin\Delta\theta_i}{dt}i_{fdi}^c\sin\Delta\theta_i\right) + \\ \qquad\left[R_{xi}i_{fdi}^c\sin\Delta\theta_i + \omega_0(L_{xi} + L_T)i_{fdi}^c\cos\Delta\theta_i + (L_{xi} + L_T)\dfrac{di_{fdi}^c\sin\Delta\theta_i}{dt}\right]X_{\theta i} \\ V_{hi4} = -(L_{xi} + 2L_T)\left(\dfrac{di_{fqi}^c\cos\Delta\theta_i}{dt}i_{fqi}^c\cos\Delta\theta_i + \dfrac{di_{fqi}^c\sin\Delta\theta_i}{dt}i_{fqi}^c\sin\Delta\theta_i\right) + \\ \qquad\left[R_{xi}i_{fqi}^c\cos\Delta\theta_i - \omega_0(L_{xi} + L_T)i_{fqi}^c\sin\Delta\theta_i + (L_{xi} + L_T)\dfrac{di_{fqi}^c\cos\Delta\theta_i}{dt}\right]X_{\theta i} \\ V_{hi5} = -(L_{xi} + 2L_T)\left(\begin{array}{c}-\dfrac{di_{fdi}^c\cos\Delta\theta_i}{dt}i_{fqi}^c\sin\Delta\theta_i - \dfrac{di_{fqi}^c\sin\Delta\theta_i}{dt}i_{fdi}^c\cos\Delta\theta_i \\ +\dfrac{di_{fqi}^c\cos\Delta\theta_i}{dt}i_{fqi}^c\sin\Delta\theta_i - \dfrac{di_{fdi}^c\sin\Delta\theta_i}{dt}i_{fqi}^c\cos\Delta\theta_i\end{array}\right)\end{array}\right.$$

where $V_{hi1}$ represents the energy flow of the energy transfer path of the DC voltage outer loop, current loop d axis, and PLL of the i-th wind turbine generator; $V_{hi2}$ represents the energy flow of the energy transfer path of the DC voltage outer loop, current loop q axis, and PLL of the i-th wind turbine generator; $V_{hi3}$ represents the energy flow of the energy transfer path of the current loop d axis and PLL of the i-th wind turbine generator; $V_{hi4}$ represents the energy flow of the energy transfer path of the current loop q axis of the i-th wind turbine generator and the phase locked loop of the i-th wind turbine generator, and $V_{hi5}$ represents the energy flow of the energy transfer path of the current loop d axis, q axis of the i-th wind turbine generator, and the phase locked loop of the i-th wind turbine generator.

Figure 4:
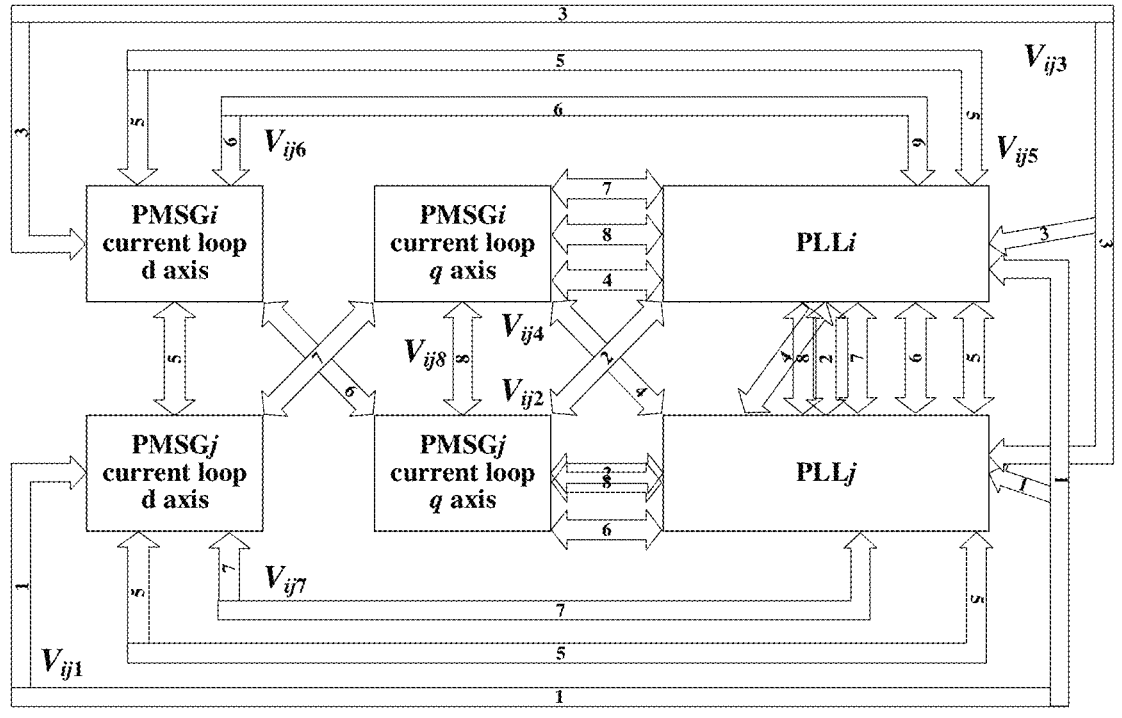
FIG. 4 is a coupling energy transfer path diagram of each subsystem between the direct drive wind turbine generators provided in example 1 of the application.

As shown in FIG. 4, the energy flows of each coupling energy transfer path obtained by dividing the generator-generator coupling paths are as follows:

$$\left\{\begin{array}{l}V_{ij1} = \omega_0 L_T i_{fdj}^c\cos\Delta\theta_j X_{\theta i} + L_T\dfrac{di_{fdj}^c\sin\Delta\theta_j}{dt}X_{\theta i} \\ V_{ij2} = -\omega_0 L_T i_{fqj}^c\sin\Delta\theta_j + L_T\dfrac{di_{fqj}^c\cos\Delta\theta_j}{dt}X_{\theta i} \\ V_{ij3} = \omega_0 L_T i_{fdi}^c\cos\Delta\theta_i X_{\theta j} + L_T\dfrac{di_{fdi}^c\sin\Delta\theta_i}{dt}X_{\theta j} \\ V_{ij4} = -\omega_0 L_T i_{fqi}^c\sin\Delta\theta_i X_{\theta j} + L_T\dfrac{di_{fqi}^c\cos\Delta\theta_i}{dt}X_{\theta j} \\ V_{ij5} = -2L_T\left(\dfrac{di_{fdj}^c\cos\Delta\theta_j}{dt}i_{fdi}^c\cos\Delta\theta_i + \dfrac{di_{fdj}^c\sin\Delta\theta_j}{dt}i_{fdi}^c\sin\Delta\theta_i + \right. \\ \qquad\left.\dfrac{di_{fdi}^c\cos\Delta\theta_i}{dt}i_{fdj}^c\cos\Delta\theta_j + \dfrac{di_{fdi}^c\sin\Delta\theta_i}{dt}i_{fdj}^c\sin\Delta\theta_j\right) \\ V_{ij6} = -2L_T\left(-\dfrac{di_{fqj}^c\sin\Delta\theta_j}{dt}i_{fdi}^c\cos\Delta\theta_i + \dfrac{di_{fqj}^c\cos\Delta\theta_j}{dt}i_{fdi}^c\sin\Delta\theta_i - \right. \\ \qquad\left.\dfrac{di_{fdi}^c\cos\Delta\theta_i}{dt}i_{fqj}^c\sin\Delta\theta_j + \dfrac{di_{fqi}^c\sin\Delta\theta_i}{dt}i_{fqj}^c\cos\Delta\theta_j\right) \\ V_{ij7} = -2L_T\left(-\dfrac{di_{fqj}^c\cos\Delta\theta_j}{dt}i_{fqi}^c\sin\Delta\theta_i + \dfrac{di_{fdj}^c\sin\Delta\theta_j}{dt}i_{fqi}^c\cos\Delta\theta_i - \right. \\ \qquad\left.\dfrac{di_{fqi}^c\sin\Delta\theta_i}{dt}i_{fdj}^c\cos\Delta\theta_j + \dfrac{di_{fqi}^c\cos\Delta\theta_i}{dt}i_{fdj}^c\sin\Delta\theta_j\right) \\ V_{ij8} = -2L_T\left(\dfrac{di_{fqj}^c\sin\Delta\theta_j}{dt}i_{fqi}^c\sin\Delta\theta_i + \dfrac{di_{fqj}^c\cos\Delta\theta_j}{dt}i_{fqi}^c\cos\Delta\theta_i + \right. \\ \qquad\left.\dfrac{di_{fqi}^c\sin\Delta\theta_i}{dt}i_{fqj}^c\sin\Delta\theta_j + \dfrac{di_{fqi}^c\cos\Delta\theta_i}{dt}i_{fqj}^c\cos\Delta\theta_j\right)\end{array}\right.$$

where $V_{ij1}$ represents the energy flow of the energy transfer path of the phase locked loop of the i-th wind turbine generator, the current loop d axis of the i-th wind turbine generator, and the phase locked loop of the j-th wind turbine generator; $V_{ij2}$ represents the energy flow of the energy transfer path of the phase locked loop of the i-th wind turbine generator, the current loop q axis of the j-th wind turbine generator, and the phase locked loop of the j-th wind turbine generator; $V_{ij3}$ represents the energy flow of the energy transfer path of the current loop d axis of the i-th wind turbine generator, the phase locked loop of the i-th wind turbine generator, and the phase locked loop of the j-th wind turbine generator; $V_{ij4}$ represents the energy flow of the energy transfer path of the current loop q axis of the i-th wind turbine generator, the phase locked loop of the i-th wind turbine generator, and the phase locked loop of the j-th wind turbine generator; $V_{ij5}$ represents the energy flow of the energy transfer path of the current loop d axis of the i-th wind turbine generator, the phase locked loop of the i-th wind turbine generator, the current loop d axis of the j-th wind turbine generator, and the phase locked loop of the j-th wind turbine generator; $V_{ij6}$ represents the energy flow of the energy transfer path of the current loop d axis of the i-th wind turbine generator, the phase locked loop of the i-th wind turbine generator, the current loop q axis of the j-th wind turbine generator, and the phase locked loop of the j-th wind turbine generator; $V_{ij7}$ represents the energy flow of the energy transfer path of the current loop q axis of the i-th wind turbine generator, the phase locked loop of the i-th wind turbine generator, the current loop d axis of the j-th wind turbine generator, and the phase locked loop of the j-th wind turbine generator; $V_{ij8}$ represents the energy flow of the energy transfer path of the current loop q axis of the i-th wind turbine generator, the phase locked loop of the i-th wind turbine generator, the current loop q axis of the j-th wind turbine generator, and the phase locked loop of the j-th wind turbine generator.

Figure 5:
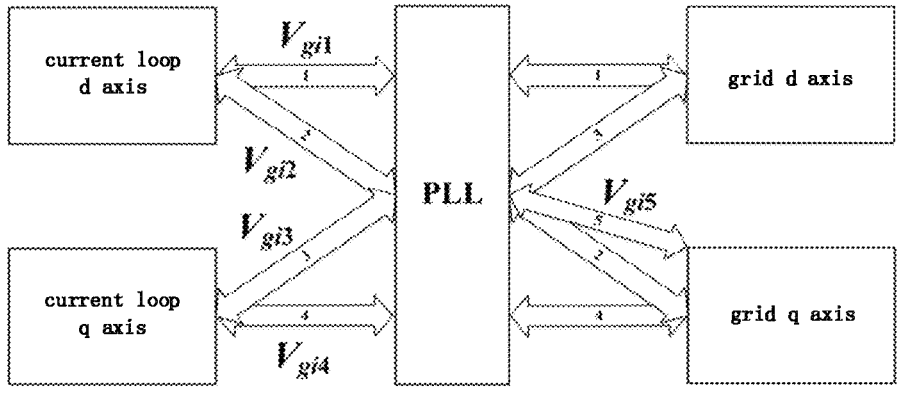
FIG. 5 is a coupling energy transfer path diagram between a direct drive wind turbine generator and a power grid subsystem for example 1 of the application.
Figure 6A:
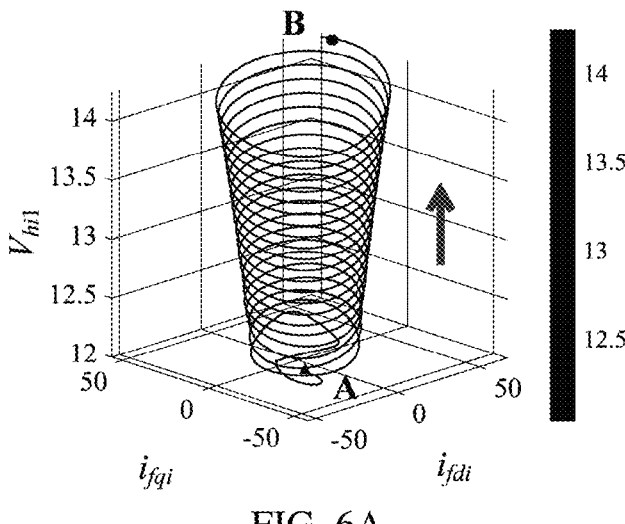
FIG. 6A is a graph of the energy flow $V_{hi1}$ of the generator internal coupling energy transfer path for example 3 of the application.
Figure 6B:
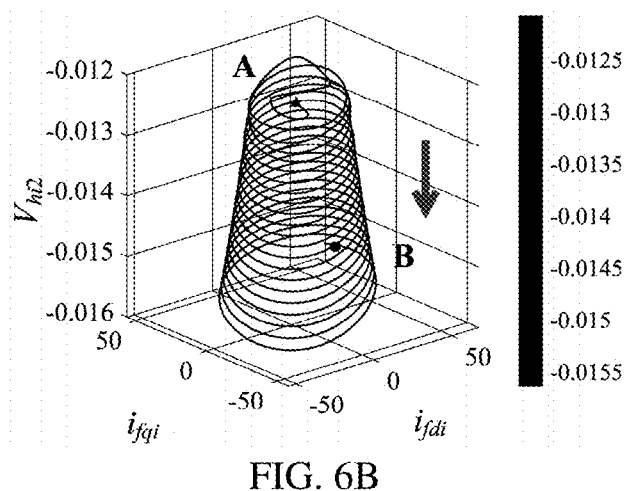
FIG. 6B is a graph of the energy flow $V_{hi2}$ of the generator internal coupling energy transfer path provided for example 3 of the application.
Figure 6C:
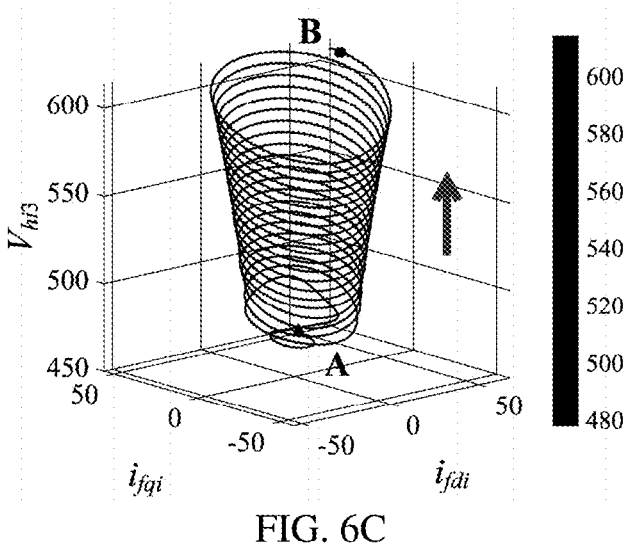
FIG. 6C is a diagram of the energy flow $V_{hi3}$ of the generator internal coupling energy transfer path provided for example 3 of the application.
Figure 6D:
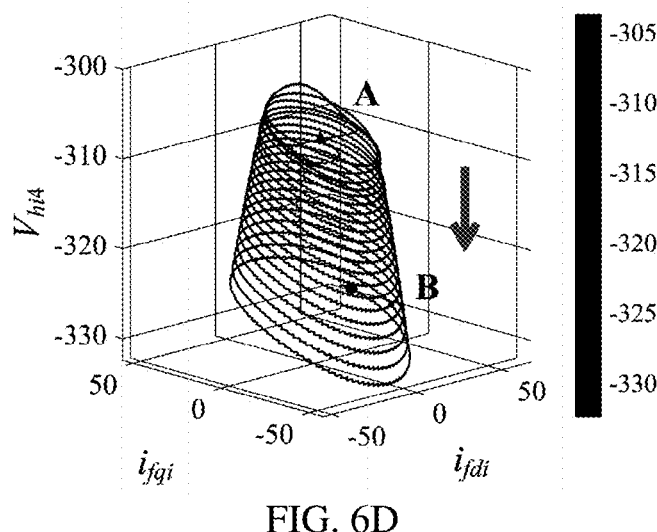
FIG. 6D is a diagram of the energy flow $V_{hi4}$ of the generator internal coupling energy transfer path provided for example 3 of the application.
Figure 6E:
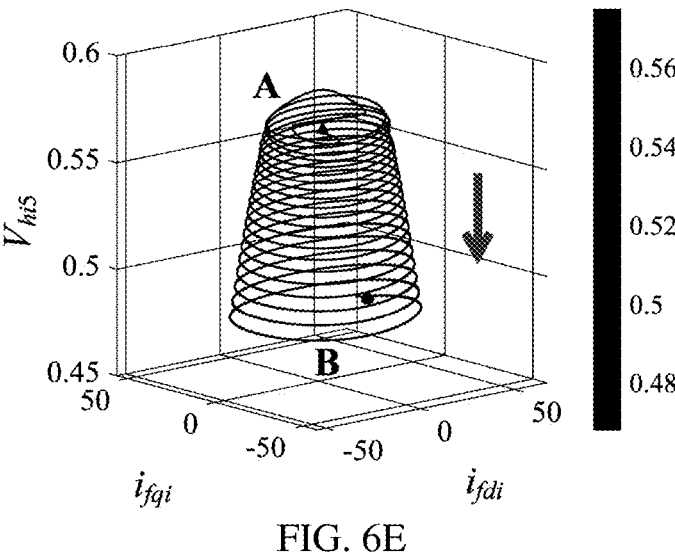
FIG. 6E is a graph of the energy flow $V_{hi5}$ of the generator internal coupling energy transfer path for example 3 of the application.
Figure 7A:
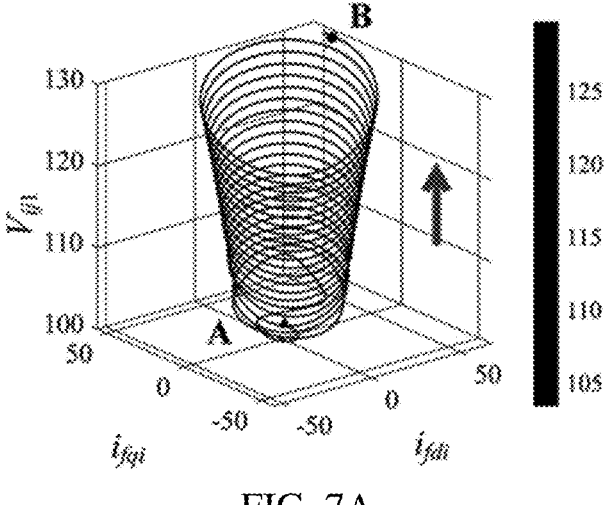
FIG. 7A is a graph of the energy flow $V_{ij1}$ of the generator-generator coupling energy transfer path provided for example 3 of the application.
Figure 7B:
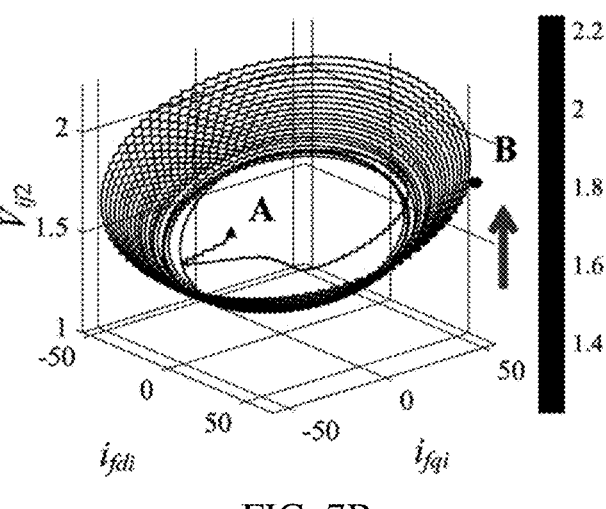
FIG. 7B is a graph of the energy flow $V_{ij2}$ of the generator-generator coupling energy transfer path provided for example 3 of the application.
Figure 7C:
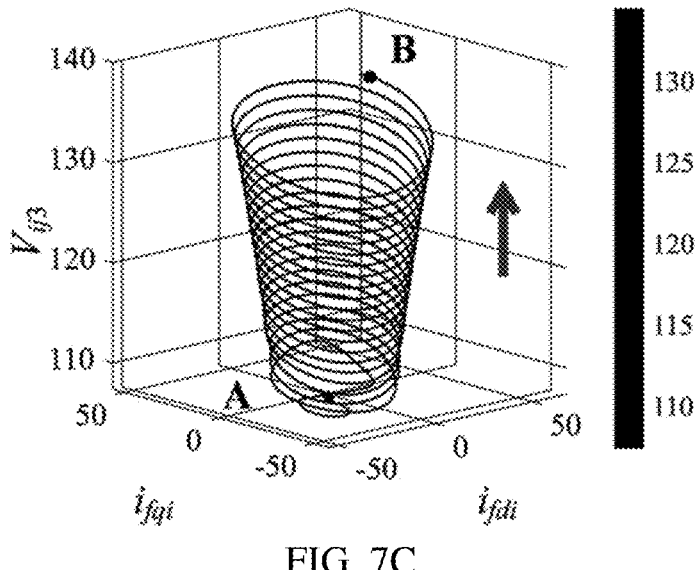
FIG. 7C is a graph of the energy flow $V_{ij3}$ of the generator-generator coupling energy transfer path provided for example 3 of the application.
Figure 7D:
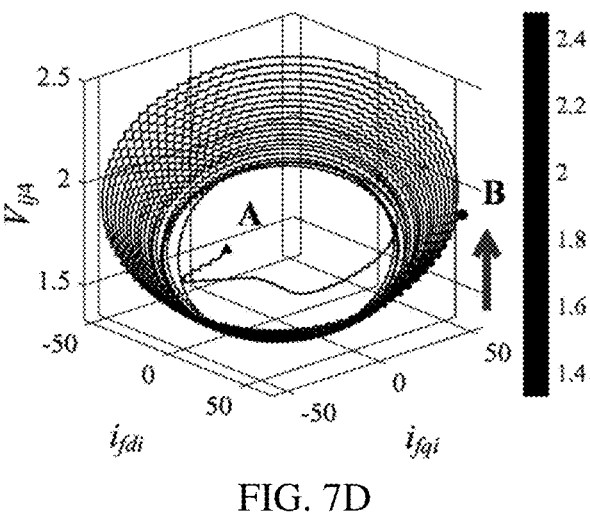
FIG. 7D is a graph of the energy flow $V_{ij4}$ of the generator-generator coupling energy transfer path provided for example 3 of the application.
Figure 7E:
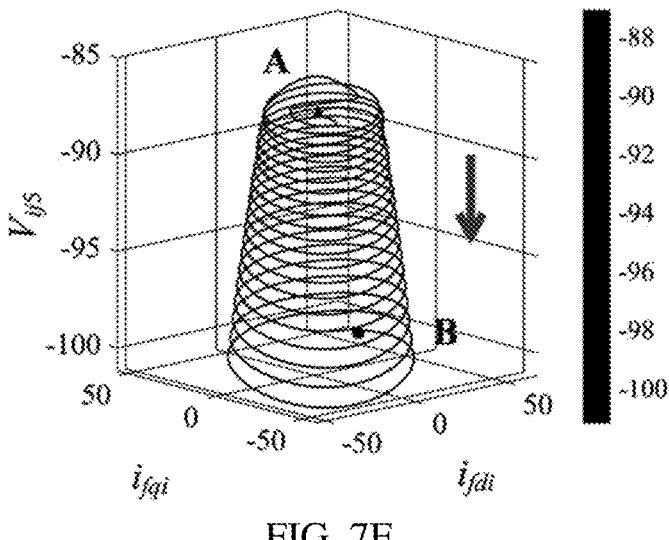
FIG. 7E is a graph of the energy flow $V_{ij5}$ of the generator-generator coupling energy transfer path provided for example 3 of the application.
Figure 7F:
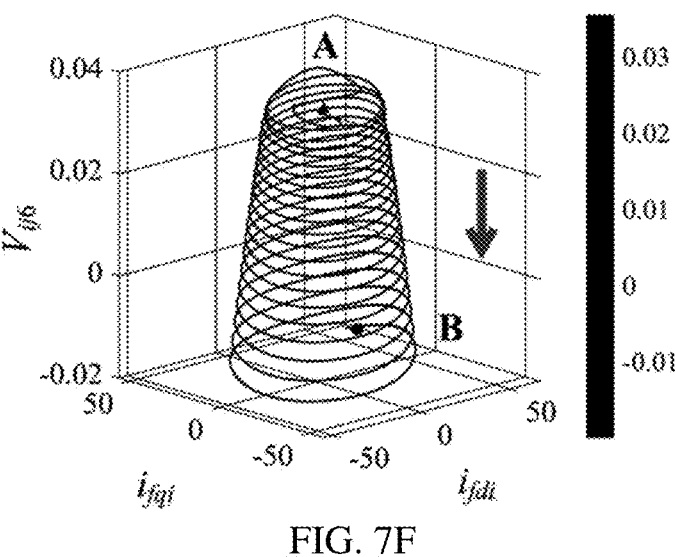
FIG. 7F is a graph of the energy flow $V_{ij6}$ of the generator-generator coupling energy transfer path provided for example 3 of the application.
Figure 7G:
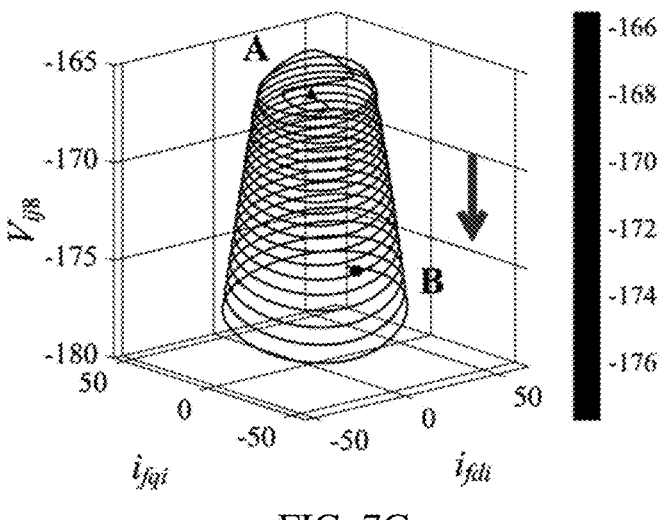
FIG. 7G is a graph of the energy flow $V_{ij7}$ in the generator-generator coupling energy transfer path provided for example 3 of the application.
Figure 7H:
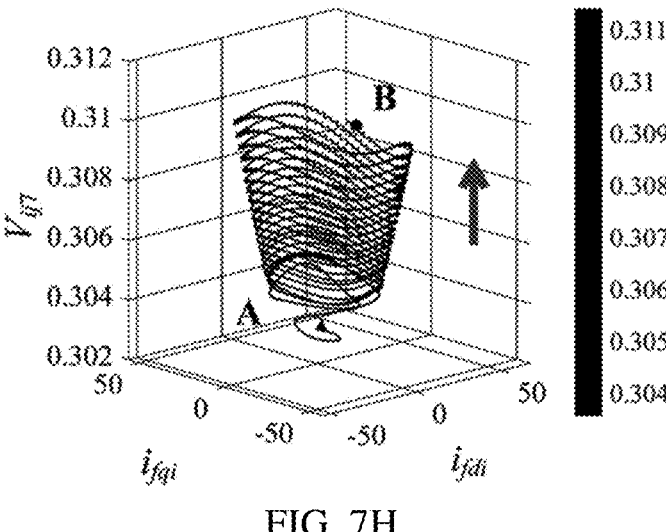
FIG. 7H is a graph of the energy flow $V_{ij8}$ in the generator-generator coupling energy transfer path provided for example 3 of the application.
Figure 8A:
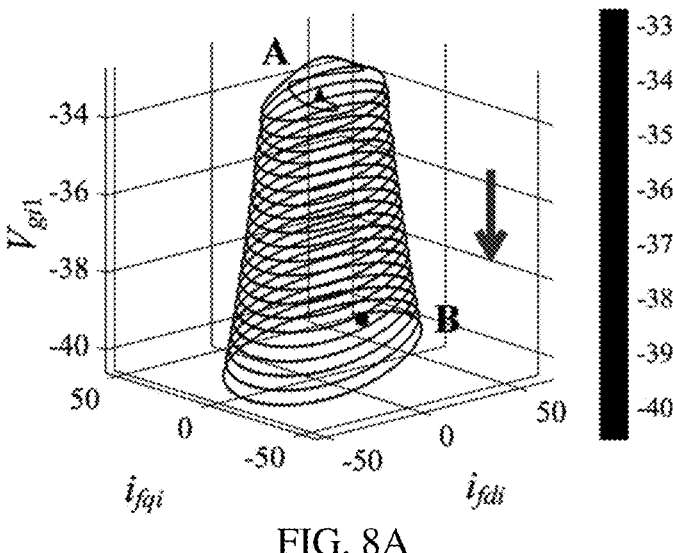
FIG. 8A is a graph of the energy flow $V_{gi1}$ of the generator-grid coupling energy transfer path for example 3 of the application.
Figure 8B:
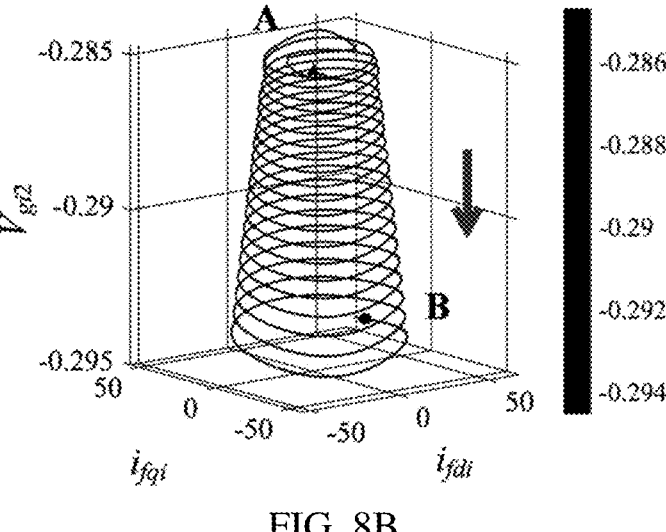
FIG. 8B is a graph of the energy flow $V_{gi2}$ of the generator-grid coupling energy transfer path for example 3 of the application.
Figure 8C:
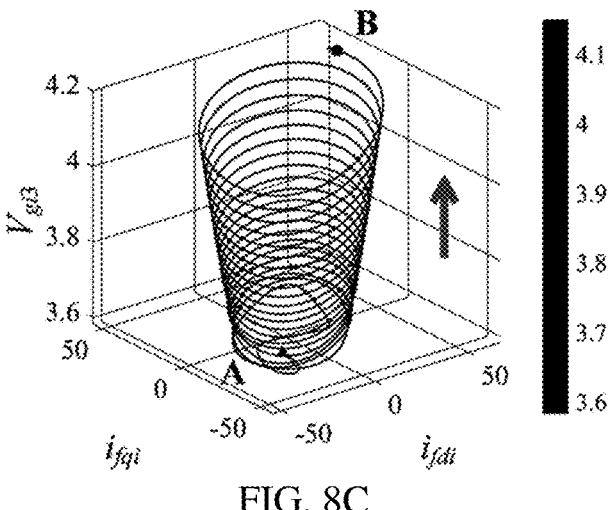
FIG. 8C is a graph of the energy flow $V_{gi3}$ of the generator-grid coupling energy transfer path for example 3 of the application.
Figure 8D:
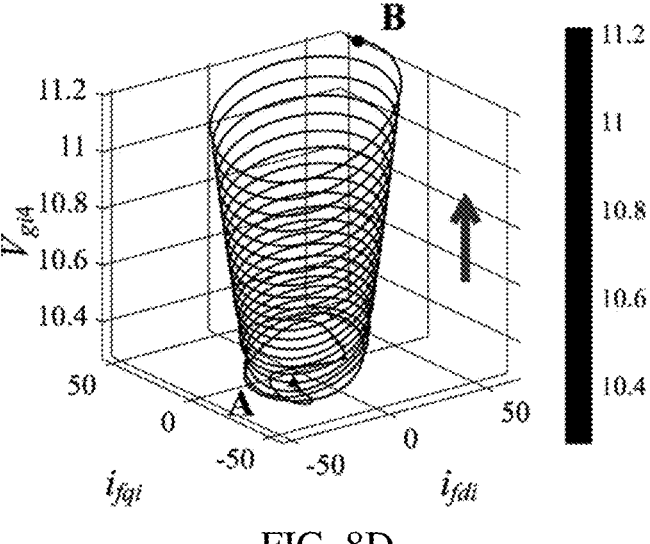
FIG. 8D is a graph of the energy flow $V_{gi4}$ of the generator-grid coupling energy transfer path for example 3 of the application.
Figure 8E:
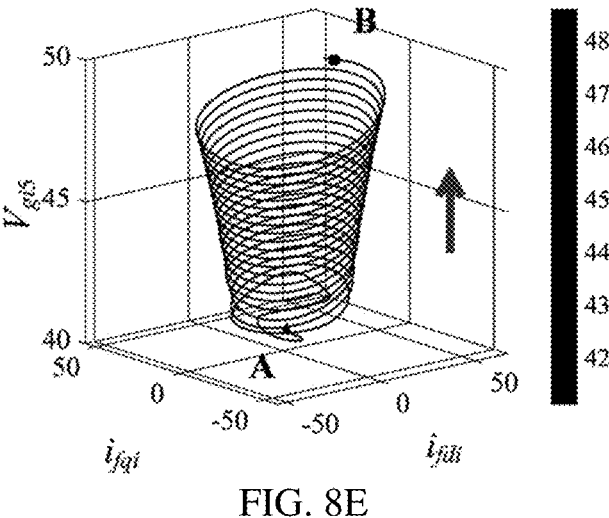
FIG. 8E is a graph of the energy flow $V_{gi5}$ of the generator-grid coupling energy transfer path for example 3 of the application.

As shown in FIG. 5, the energy flows of each coupling energy transfer path obtained by dividing the generator-grid coupling paths are as follows:

$$
\begin{cases}
V_{gi1} = -2u_{md}i^c_{fdi}\cos\Delta\theta_i \\
V_{gi2} = -2u_{mq}i^c_{fdi}\sin\Delta\theta_i \\
V_{gi3} = 2u_{md}i^c_{fqi}\sin\Delta\theta_i \\
V_{gi4} = -2u_{mq}i^c_{fqi}\cos\Delta\theta_i \\
V_{gi5} = u_{mq}X_{\theta i}
\end{cases}
$$

where $V_{gi1}$ represents the energy flow of the energy transfer path of the current loop d axis of the i-th wind turbine generator, the phase locked loop of the i-th wind turbine generator, and the d axis of the grid; $V_{gi2}$ represents the energy flow of the energy transfer path of the current loop d axis of the i-th wind turbine generator, the phase locked loop of the i-th wind turbine generator, and the q axis of the grid; $V_{gi3}$ represents the energy flow of the energy transfer path of the current loop q axis of the i-th wind turbine generator, the phase locked loop of the i-th wind turbine generator, and the d axis of the grid; $V_{gi4}$ represents the energy flow of the energy transfer path of the current loop q axis of the i-th wind turbine generator, the phase locked loop of the i-th wind turbine generator, and the q axis of the grid; $V_{gi5}$ represents the energy flow of the energy transfer path of the phase locked loop of the i-th wind turbine generator and the q axis of the grid.

S3: According to the energy flow of the coupling energy transfer path of the direct drive wind farm in each acquisition period, the key energy transfer path of the direct drive wind farm in each acquisition period is tracked, and the stability control of the direct drive wind farm is realized.

When implemented, key energy transfer paths of direct drive wind farms are tracked by:

Based on the set time interval, the energy flow of the last acquisition period of each coupling energy transfer path of the direct drive wind farm in this time interval is subtracted from the energy flow of the first acquisition period, and the energy flow variation of each coupling energy transfer path of the direct drive wind farm in this time interval is obtained.

Based on the energy flow variation of each coupling energy transfer path of a direct drive wind farm in the set time interval, the coupling energy transfer paths with the largest energy flow variation in the energy flows of the generator internal coupling path, the generator-generator coupling path and the generator-grid coupling path are obtained respectively, and the obtained coupling energy transfer paths are taken as the key energy transfer paths of the direct drive wind farm in the time interval.

Preferably, the set time interval is two adjacent acquisition periods, and the key energy transfer path of the direct drive wind farm for each acquisition period can be obtained.

It can be understood that the coupling energy transfer path is the corresponding derivative, and the specific value of the derivative represents the increase or decrease of the energy flow of the coupling energy transfer path. By comparing the specific value of each coupling energy transfer path, that is, the increase or decrease of the energy flow, the key energy transfer path affecting the stability of the direct drive wind farm is tracked, and the key control link affecting the stability level of the system is selected out.

Further, by tracking the key energy transfer path, the adverse control link in the direct drive wind farm is defined, and the oscillation is suppressed by adding the energy compensation branch in the corresponding control link, so as to achieve the stability control of the direct drive wind farm.

Compared with the prior art, this example provides a method for tracking the oscillation path of a direct drive wind farm. By taking the dominant oscillation mode period as the acquisition period when a direct drive wind farm fails, the corresponding instantaneous value of each oscillation component is obtained by collecting data, and the energy flow of the coupling energy transfer path between subsystems of the direct drive wind farm in each acquisition period is obtained. Then, the key energy transfer path of the direct drive wind farm in each acquisition period is tracked to achieve accurate and effective tracking of the key energy transfer path of the grid-connected system of the direct drive wind farm, and guiding suggestions are given for the stable and safe operation of the power system. And by dividing the whole wind turbine generator into multiple subsystems, the key control links that affect the stability level of the system are selected out. The coupling energy transfer paths obtained by dynamic coupling energy derivatives reduce the calculation amount, improve the calculation accuracy, and ensure the reliable operation of the system.

Example 2

A specific embodiment of the application discloses a direct drive wind farm oscillation path tracking system, which comprises:

The data acquisition module is used to collect the port current, the current and state variable of the current inner loop, the dynamic angle and state component of the phase-locked loop, and the phase and amplitude of the fault point voltage of each wind turbine generator when a direct drive wind farm fails, and then to obtain the corresponding instantaneous value of each oscillation component of the direct drive wind turbine generator.

The coupling energy transfer path acquisition module is used to obtain the energy flow of the coupling energy transfer path of the direct drive wind farm in each acquisition period based on the instantaneous value of each oscillation component collected in each acquisition period.

The key energy transfer path tracking module is used to track the key energy transfer path of the direct drive wind farm in each acquisition period according to the energy flow of the coupling energy transfer path of the direct drive wind farm in each acquisition period, and then to realize the stability control of the direct drive wind farm.

When implemented, the coupling energy transfer path acquisition module obtains the energy flow of the coupling energy transfer path between subsystems of the direct drive wind farm in each acquisition period through the following ways:

Based on the instantaneous value of each oscillation component collected in each acquisition period, the dynamic mathematical model of each subsystem of each direct drive wind turbine generator in each acquisition period is established. The subsystems include current loop d, q axis subsystems, grid-connected line d, q axis subsystems, DC voltage outer loop subsystem and phase-locked loop subsystem.

According to the dynamic mathematical model of each subsystem of each direct drive wind turbine generator in each acquisition period, the dynamic coupling energy derivative of each subsystem of each direct drive wind turbine generator is obtained, and the dynamic coupling energy derivative of each generator in each acquisition period is obtained. The corresponding value is used as the energy flow of the dynamic coupling energy transfer path of each generator in each acquisition period.

The energy flow of the dynamic coupling energy transfer path of each generator in each acquisition period is divided to obtain the energy flow of the generator internal coupling path, the generator-generator coupling path and the generator-grid coupling path. Then the energy flow of the generator internal coupling path, the generator-generator coupling path and the generator-grid coupling path is divided respectively to obtain the energy flow of each coupling energy transfer path of the direct drive wind farm in each acquisition period.

The specific implementation process of the embodiment of the application can be referred to the above method embodiment, and the embodiment will not be repeated here.

Since the principle of this embodiment is the same as that of the above method embodiments, the system also has the corresponding technical effects of the above method embodiments.

Example 3

In order to verify the correctness and feasibility of the direct drive wind farm oscillation path tracking method and system provided by examples 1 and 2 of the application, the scheme in the above examples is tested and verified. The grid-connected system of two direct drive wind farms is built from the simulation level, and the impedance of the AC system is changed to obtain the oscillating divergence scene after the system is disturbed. The system simulation structure diagram is shown in FIG. 2. The simulation model is built on the RT-LAB platform. The parameters of grid-connected system of direct drive wind farm are shown in Table 1.

TABLE 1

| Parameters of grid-connected system of direct drive wind farm | | |
|---|---|---|
| parameter | symbol | value |
| rated power | $P_n$/MW | 1.5 |
| current loop control parameters | $k_{P1}$ | 0.495e−3 |
| | $k_{I1}$ | 0.121 |
| PLL control parameters | $K_{P\theta}$ | 0.67 |
| | $K_{I\theta}$ | 38.2 |
| grid-connected inductance | $L_{x1}$, $L_{x2}$/H | 0.3e−3, 0.2e−3 |
| DC voltage outer loop control | $k_{Pu1}$ | 0.1 |
| parameters | $k_{Iu1}$ | 10 |
| DC voltage | $U_{dc}$/kV | 1.2 |

The changes of energy flows $V_{hi1}$, $V_{hi2}$, $V_{hi3}$, $V_{hi4}$ and $V_{hi5}$ of each coupling energy transfer path within a direct drive wind turbine generator are shown in FIGS. 6A-6E, respectively. During the oscillation process, the d and q axis oscillation currents $i_{fd1}$ and $i_{fq1}$ of PMSG1 gradually increase, and the energy flow of each transfer path also changes. In FIGS. 6A-6E, with the development of oscillation, the energy flow spirals from locus A to locus B. Among them, the value of $V_{hi1}$ gradually increases from 12.22 to 14.24, the value of $V_{hi2}$ gradually decreases from −0.012 to −0.016, the value of $V_{hi3}$ gradually increases from 482.15 to 570.06, and the value of $V_{hi4}$ gradually decreases from −312.56 to −329.76. The value of $V_{hi5}$ gradually decreases from 0.57 to 0.47. It can be seen that the energy flow $V_{hi3}$ of the transfer path has the largest variation, so the coupling energy transfer path under the action of current loop d axis and PLL is the key energy path of the generator-internal coupling path, and the existing stability evaluation method verifies that it is the key factor affecting the stability of the system, which proves the correctness of the determined key energy path.

The changes of dynamic coupling energy flows $V_{ij1}$, $V_{ij2}$, $V_{ij3}$, $V_{ij4}$, $V_{ij5}$, $V_{ij6}$, $V_{ij7}$ and $V_{ij8}$ in each transfer path between PMSGi and PMSGj generators are shown in FIGS. 7A-7H respectively. As the d and q axis oscillation current $i_{fd1}$ and $i_{fq1}$ of PMSG1 increase gradually during the oscillation process, the dynamic coupling energy flow of each transfer path also changes. In FIGS. 7A-7H, with the development of oscillation, the energy flow spirals from locus A to locus B. Among them, the value of $V_{ij1}$ gradually increases from 104.11 to 129.58, the value of $V_{ij2}$ gradually increases from 1.49 to 1.85, the value of $V_{ij3}$ gradually increases from 108.01 to 133.96, and the value of $V_{ij4}$ gradually increases from 1.67 to 1.92. The value of $V_{ij5}$ gradually decreases from −87.12 to −101.18, the value of $V_{ij6}$ gradually decreases from 0.035 to −0.02, the value of $V_{ij7}$ gradually increases from 0.30 to 0.31, and the value of $V_{ij8}$ gradually decreases from −168.06 to −177.73. Compared with the above, it can be seen that the energy flow $V_{ij3}$ of the transfer path has the largest variation. Therefore, for the generator-generator coupling, the coupling transfer path between the current loop d axis of one wind turbine generator and the phase-locked loop of another wind turbine generator is the key energy transfer path of the generator-generator coupling path, and the existing stability evaluation method has verified that it is the key factor affecting the stability of the system. The correctness of the determined key energy path is proved.

The changes of dynamic coupling energy flows $V_{gi1}$, $V_{gi2}$, $V_{gi3}$, $V_{gi4}$ and $V_{gi5}$ in each transfer path of direct drive wind turbine generators are shown in FIGS. 8A-8E, respectively. As the d and q axis oscillation current $i_{fd1}$ and $i_{fq1}$ of PMSG1 increase gradually during the oscillation process, the dynamic coupling energy flow of each transfer path also changes. In FIGS. 8A-8E, with the development of oscillation, the energy flow spirals from locus A to locus B. Among them, the value of $V_{gi1}$ gradually decreases from −34.33 to −40.38, that of $V_{gi2}$ gradually decreases from −0.28 to −0.30, that of $V_{gi3}$ gradually increases from 3.59 to 4.15, and that of $V_{gi4}$ gradually increases from 10.35 to 11.21. The value of $V_{gi5}$ gradually increased from 41.16 to 48.53. It can be seen that the energy flow $V_{gi5}$ of the transfer path has the largest variation. Therefore, for the coupling of generator and grid, the coupling transfer path between PLL and the q axis of the power grid is the key energy transfer path of the coupling path of generator and grid, and it is verified by the existing stability evaluation method that it is the key factor affecting the stability of the system, which proves the correctness of the determined key energy path.

It is understood by those skilled in the art that all or part of the process to implement the above exemplary methods may be accomplished by instructing the relevant hardware by means of a computer program that may be stored in a computer readable storage medium. The computer readable storage medium is a disk, optical disc, read-only storage memory or random storage memory, etc.

The above is only the best concrete embodiment of the invention, but the scope of protection of the invention is not limited to this, and any change or replacement that can be easily thought of by a technical person familiar with the technical field within the technical scope disclosed by the invention shall be covered by the scope of protection of the invention.

What is claimed is:

1. A method for tracking oscillation path of a direct drive wind farm, comprising:

when the direct drive wind farm failing, collecting a port current, current and state variables of a current inner loop, dynamic angle and state component of a phase-locked loop (PLL) of each direct drive wind turbine generator, and phase and amplitude of a voltage of a fault point in an acquisition period which is used as a dominant oscillation mode period, and then obtaining a corresponding instantaneous value of each oscillation component of said each direct drive wind turbine generator;

obtaining an energy flow of a coupling energy transfer path of the direct drive wind farm in each acquisition period based on the corresponding instantaneous value of each oscillation component collected in said each acquisition period;

tracking a key energy transfer path of the direct drive wind farm according to the energy flow of the coupling energy transfer path of the direct drive wind farm in said each acquisition period, so as to realize stability control of the direct drive wind farm.

2. The method according to claim 1, wherein the energy flow of the coupling energy transfer path between subsystems of the direct drive wind farm in said each acquisition period is obtained by the following way:

establishing a dynamic mathematical model of each subsystem of said each direct drive wind turbine generator in said each acquisition period based on the corresponding instantaneous value of each oscillation component collected in said each acquisition period, wherein the subsystems include current loop d, q axis subsystems, grid-connected line d, q axis subsystems, DC voltage outer loop subsystem and phase-locked loop subsystem;

obtaining a dynamic coupling energy derivative of each subsystem of said each direct drive wind turbine generator according to the dynamic mathematical model of each subsystem of said each direct drive wind turbine generator in said each acquisition period, and then obtaining a dynamic coupling energy derivative of said each direct drive wind turbine generator in said each acquisition period, a value corresponding to the dynamic coupling energy derivative of said each direct drive wind turbine generator in said each acquisition period is used as an energy flow of a dynamic coupling energy transfer path of said each direct drive wind turbine generator in said each acquisition period;

obtaining energy flows of a generator internal coupling path, a generator-generator coupling path and a generator-grid coupling path by dividing the energy flow of the dynamic coupling energy transfer path of said each direct drive wind turbine generator in said each acquisition period, then obtaining an energy flow of each coupling energy transfer path of the direct drive wind farm in said each acquisition period by dividing the energy flows of the generator internal coupling path, the generator-generator coupling path, and the generator-grid coupling path.

3. The method according to claim 2, wherein the tracking the key energy transfer path of the direct drive wind farm is traced in the following ways:

based on a set time interval, obtaining energy flow variation of each coupling energy transfer path of the direct drive wind farm in the set time interval by subtracting energy flow of a last acquisition period of said each coupling energy transfer path of the direct drive wind farm in the set time interval from energy flow of a first acquisition period;

based on the energy flow variation of each coupling energy transfer path of the direct drive wind farm in the set time interval, obtaining respectively the coupling energy transfer paths with a largest energy flow variation in the energy flows of the generator internal coupling path, the generator-generator coupling path and the generator-grid coupling path, and taking the coupling energy transfer paths obtained as the key energy transfer paths of the direct drive wind farm in the set time interval.

4. The method according to claim 2, wherein the energy flow of each coupling energy transfer path obtained by dividing the energy flow of the generator internal coupling path are respectively:

$$\begin{cases} V_{hi1} = i_{drefi} u^c_{kdi} \cos\Delta\theta_i \\[4pt] V_{hi2} = -i_{drefi} u^c_{kqi} \sin\Delta\theta_i \\[4pt] V_{hi3} = -(L_{xi} + 2L_T)\left(\dfrac{di^c_{fdi}\cos\Delta\theta_i}{dt} i^c_{fdi}\cos\Delta\theta_i + \dfrac{di^c_{fdi}\sin\Delta\theta_i}{dt} i^c_{fdi}\sin\Delta\theta_i\right) + \\[6pt] \qquad \left[R_{xi} i^c_{fdi}\sin\Delta\theta_i + \omega_0(L_{xi}+L_T)i^c_{fdi}\cos\Delta\theta_i + (L_{xi}+L_T)\dfrac{di^c_{fdi}\sin\Delta\theta_i}{dt}\right]X_{\theta i} \\[6pt] V_{hi4} = -(L_{xi} + 2L_T)\left(\dfrac{di^c_{fqi}\cos\Delta\theta_i}{dt} i^c_{fqi}\cos\Delta\theta_i + \dfrac{di^c_{fqi}\sin\Delta\theta_i}{dt} i^c_{fqi}\sin\Delta\theta_i\right) + \\[6pt] \qquad \left[R_{xi} i^c_{fqi}\cos\Delta\theta_i - \omega_0(L_{xi}+L_T)i^c_{fqi}\sin\Delta\theta_i + (L_{xi}+L_T)\dfrac{di^c_{fqi}\cos\Delta\theta_i}{dt}\right]X_{\theta i} \\[6pt] V_{hi5} = -(L_{xi} + 2L_T)\left(-\dfrac{di^c_{fdi}\cos\Delta\theta_i}{dt} i^c_{fqi}\sin\Delta\theta_i - \dfrac{di^c_{fqi}\sin\Delta\theta_i}{dt} i^c_{fdi}\cos\Delta\theta_i \right. \\[6pt] \qquad \left. + \dfrac{di^c_{fqi}\cos\Delta\theta_i}{dt} i^c_{fdi}\sin\Delta\theta_i - \dfrac{di^c_{fdi}\sin\Delta\theta_i}{dt} i^c_{fqi}\cos\Delta\theta_i\right) \end{cases}$$

Where, $V_{hi1}$ represents an energy flow of an energy transfer path of DC voltage outer loop, current loop d axis, and the PLL (phase locked loop) of an i-th wind turbine generator; $V_{hi2}$ represents an energy flow of an energy transfer path of the DC voltage outer loop, current loop q axis, and the PLL of the i-th wind turbine generator; $V_{hi3}$ represents an energy flow of an energy transfer path of the current loop d axis and the PLL of the i-th wind turbine generator; $V_{hi4}$ represents an energy flow of an energy transfer path of the current loop q axis of the i-th wind turbine generator and the PLL of the i-th wind turbine generator, and $V_{hi5}$ represents an energy flow of an energy transfer path of each of the current loop d axis and the current loop q axis of the i-th wind turbine generator and the PLL of the i-th wind turbine generator; $i_{drefi}$ is a d-axis current reference value of the current inner loop of the i-th wind turbine generator, $$u^c_{kdi}$$

and $$u^c_{kqi}$$

are respectively d and q axis components of the state variable of the current inner loop of the i-th wind turbine generator under a d-q coordinate system of a control system, $\Delta\theta_i$ is a dynamic angle of the PLL of the i-th wind turbine generator, $R_{xi}$ and $L_{xi}$ are respectively a resistance and an inductance of a grid-connected line of the i-th wind turbine generator, $$i^c_{fdi}$$

and $$i^c_{fqi}$$

are d and q axis components of an output current of the i-th wind turbine generator under the d-q coordinate system of the control system, $L_T$ is an inductance of a transformer at a grid-connected bus bar outlet, $\omega_0$ is a grid synchronous angular frequency, and $X_{\theta i}$ is a state variable of the PLL of the i-th wind turbine generator.

5. The method according to claim 4, wherein the energy flow of each coupling energy transfer path obtained by dividing the energy flow of the generator-generator coupling path are as follows:

$$\begin{cases} V_{ij1} = \omega_0 L_T i^c_{fdj}\cos\Delta\theta_j X_{\theta i} + L_T\dfrac{di^c_{fdj}\sin\Delta\theta_j}{dt}X_{\theta i} \\[6pt] V_{ij2} = -\omega_0 L_T i^c_{fqj}\sin\Delta\theta_j + L_T\dfrac{di^c_{fqj}\cos\Delta\theta_j}{dt}X_{\theta i} \\[6pt] V_{ij3} = \omega_0 L_T i^c_{fdi}\cos\Delta\theta_i X_{\theta j} + L_T\dfrac{di^c_{fdi}\sin\Delta\theta_i}{dt}X_{\theta j} \\[6pt] V_{ij4} = -\omega_0 L_T i^c_{fqi}\sin\Delta\theta_i X_{\theta j} + L_T\dfrac{di^c_{fqi}\cos\Delta\theta_i}{dt}X_{\theta j} \\[6pt] V_{ij5} = -2L_T\left(\dfrac{di^c_{fdj}\cos\Delta\theta_j}{dt} i^c_{fdi}\cos\Delta\theta_i + \dfrac{di^c_{fdj}\sin\Delta\theta_j}{dt} i^c_{fdi}\sin\Delta\theta_i + \right. \\[6pt] \qquad \left. \dfrac{di^c_{fdi}\cos\Delta\theta_i}{dt} i^c_{fdj}\cos\Delta\theta_j + \dfrac{di^c_{fdi}\sin\Delta\theta_i}{dt} i^c_{fdj}\sin\Delta\theta_j\right) \\[6pt] V_{ij6} = -2L_T\left(-\dfrac{di^c_{fqj}\sin\Delta\theta_j}{dt} i^c_{fdi}\cos\Delta\theta_i + \dfrac{di^c_{fqj}\cos\Delta\theta_j}{dt} i^c_{fdi}\sin\Delta\theta_i - \right. \\[6pt] \qquad \left. \dfrac{di^c_{fdi}\cos\Delta\theta_i}{dt} i^c_{fqj}\sin\Delta\theta_j + \dfrac{di^c_{fqi}\sin\Delta\theta_i}{dt} i^c_{fqj}\cos\Delta\theta_j\right) \\[6pt] V_{ij7} = -2L_T\left(-\dfrac{di^c_{fqj}\cos\Delta\theta_j}{dt} i^c_{fqi}\sin\Delta\theta_i + \dfrac{di^c_{fdj}\sin\Delta\theta_j}{dt} i^c_{fqi}\cos\Delta\theta_i - \right. \\[6pt] \qquad \left. \dfrac{di^c_{fqi}\sin\Delta\theta_i}{dt} i^c_{fdj}\cos\Delta\theta_j + \dfrac{di^c_{fqi}\cos\Delta\theta_i}{dt} i^c_{fdj}\sin\Delta\theta_j\right) \\[6pt] V_{ij8} = -2L_T\left(\dfrac{di^c_{fqj}\sin\Delta\theta_j}{dt} i^c_{fqi}\sin\Delta\theta_i + \dfrac{di^c_{fqj}\cos\Delta\theta_j}{dt} i^c_{fqi}\cos\Delta\theta_i + \right. \\[6pt] \qquad \left. \dfrac{di^c_{fqi}\sin\Delta\theta_i}{dt} i^c_{fqj}\sin\Delta\theta_j + \dfrac{di^c_{fqi}\cos\Delta\theta_i}{dt} i^c_{fqj}\cos\Delta\theta_j\right) \end{cases}$$

where $V_{ij1}$ represents an energy flow of an energy transfer path of the phase locked loop of the i-th wind turbine generator, the current loop d axis of the i-th wind turbine generator, and a phase locked loop of a j-th wind turbine generator; $V_{ij2}$ represents an energy flow of an energy transfer path of the phase locked loop of the i-th wind turbine generator, a current loop q axis of the j-th wind turbine generator, and the phase locked loop of the j-th wind turbine generator; $V_{ij3}$ represents an energy flow of an energy transfer path of the current loop d axis of the i-th wind turbine generator, the phase locked loop of the i-th wind turbine generator, and the phase locked loop of the j-th wind turbine generator; $V_{ij4}$ represents an energy flow of an energy transfer path of the current loop q axis of the i-th wind turbine generator, the phase locked loop of the i-th wind turbine generator, and the phase locked loop of the j-th wind turbine generator; $V_{ij5}$ represents an energy flow of an energy transfer path of the current loop d axis of the i-th wind turbine generator, the phase locked loop of the i-th wind turbine generator, a current loop d axis of the j-th wind turbine generator, and the phase locked loop of the j-th wind turbine generator; $V_{ij6}$ represents an energy flow of an energy transfer path of the current loop d axis of the i-th wind turbine generator, the phase locked loop of the i-th wind turbine generator, the current loop q axis of the j-th wind turbine generator, and the phase locked loop of the j-th wind turbine generator; $V_{ij7}$ represents an energy flow of an energy transfer path of the current loop q axis of the i-th wind turbine generator, the phase locked loop of the i-th wind turbine generator, the current loop d axis of the j-th wind turbine generator, and the phase locked loop of the j-th wind turbine generator; $V_{ij8}$ represents an energy flow of an energy transfer path of the current loop q axis of the i-th wind turbine generator, the phase locked loop of the i-th wind turbine generator, the current loop q axis of the j-th wind turbine generator, and the phase locked loop of the j-th wind turbine generator; $\Delta\theta_j$ is a dynamic angle of the phase locked loop of the j-th wind turbine generator, and $$i^c_{fdj}$$

and $$i^c_{fqj}$$

are respectively d and q axis components of an output current of the j-th wind turbine generator under the d-q coordinate system of the control system; $X_{\theta j}$ is state variable of the phase locked loop of the j-th wind turbine generator.

6. The method according to claim 5, wherein the energy flow of each coupling energy transfer path obtained by dividing the energy flow of the generator-grid coupling path are respectively:

$$\begin{cases} V_{gi1} = -2u_{md}i^c_{fdi}\cos\Delta\theta_i \\ V_{gi2} = -2u_{mq}i^c_{fdi}\sin\Delta\theta_i \\ V_{gi3} = 2u_{md}i^c_{fqi}\sin\Delta\theta_i \\ V_{gi4} = -2u_{mq}i^c_{fqi}\cos\Delta\theta_i \\ V_{gi5} = u_{mq}X_{\theta i} \end{cases}$$

where $V_{gi1}$ represents an energy flow of an energy transfer path of the current loop d axis of the i-th wind turbine generator, the phase locked loop of the i-th wind turbine generator, and a d axis of a power grid; $V_{gi2}$ represents an energy flow of an energy transfer path of the current loop d axis of the i-th wind turbine generator, the phase locked loop of the i-th wind turbine generator, and a q axis of the power grid; $V_{gi3}$ represents an energy flow of an energy transfer path of the current loop q axis of the i-th wind turbine generator, the phase locked loop of the i-th wind turbine generator, and the d axis of the power grid; $V_{gi4}$ represents an energy flow of an energy transfer path of the current loop q axis of the i-th wind turbine generator, the phase locked loop of the i-th wind turbine generator, and the q axis of the power grid; $V_{gi5}$ represents an energy flow of an energy transfer path of the phase locked loop of the i-th wind turbine generator and the q axis of the power grid; $u_{md}$ and $u_{mq}$ represent d and q axis components of the voltage of the fault point respectively.

7. The method according to claim 1, wherein the dominant oscillation mode period is $$\frac{2\pi}{\omega_c};$$

where $\omega_c$ represents an oscillation frequency of the dominant oscillation mode of a system.

8. The method according to claim 6, wherein the corresponding instantaneous value of each oscillation component of said each direct drive wind turbine generator is expressed as:

$$\begin{cases} i^c_{fdi} = A_{di}e^{\alpha t}\sin(\omega_c t + \varphi_{di}) \\ i^c_{fqi} = A_{qi}e^{\alpha t}\sin(\omega_c t + \varphi_{qi}) \end{cases}$$

$$i_{drefi} = A_{drefi}e^{\alpha t}\sin(\omega_c t + \varphi_{drefi})$$

$$u^c_{kdi} = A_{ukdi}e^{\alpha t}\sin(\omega_c t + \varphi_{ukdi})$$

$$\Delta\theta_i = A_{\theta i}e^{\alpha t}\sin(\omega_c t + \varphi_{\theta i})$$

$$X_{\theta i} = A_{x\theta i}e^{\alpha t}\sin(\omega_c t + \varphi_{x\theta i})$$

$$\begin{cases} u_{md} = A_{md}e^{\alpha t}\sin(\omega_c t + \varphi_{md}) \\ u_{mq} = A_{mq}e^{\alpha t}\sin(\omega_c t + \varphi_{mq}) \end{cases}$$

where $A_{di}$ and $A_{qi}$ respectively represent amplitude of d and q axis components of an output current of the i-th wind turbine generator, $\alpha$ is a system damping coefficient, $\omega_c$ is an oscillation frequency under the d-q coordinate system of the control system, $\varphi_{di}$ and $\varphi_{qi}$ respectively represent phase of d and q axis components of the output current of the i-th wind turbine generator, and $A_{drefi}$ represents amplitude of the d-axis current reference value of the current inner loop of the i-th wind turbine generator; $\varphi_{drefi}$ is phase of the d-axis current reference value of the current inner loop of the i-th wind turbine generator, $A_{ukdi}$ is amplitude of a d-axis component of a state variable of the current inner loop of the i-th wind turbine generator, $_{ukdi}$ is phase of the d-axis component of the state variable of the current inner loop of the i-th wind turbine generator, $A_{\theta i}$ is amplitude of the dynamic angle of the phase locked loop of the i-th wind turbine generator, and $\varphi_{\theta i}$ is phase of the dynamic angle of the phase locked loop of the i-th wind turbine generator; $A_{x\theta i}$ is amplitude of state variable of the phase locked loop of the i-th wind turbine generator, $\varphi_{x\theta i}$ is phase of the state variable of the phase locked loop of the i-th wind turbine generator, $A_{md}$ and $A_{mq}$ are respectively amplitude of the d and q axis components of the voltage of the fault point, and $\varphi_{md}$ and $\varphi_{mq}$ are phase of the d and q axis components of the voltage of the fault point respectively.

9. A system for tracking oscillation path of a direct drive wind farm, comprising:

a data acquisition module, configured to collect port current, current and state variable of current inner loop, dynamic angle and state component of a phase-locked loop of each direct drive wind turbine generator, and phase and amplitude of a voltage of a fault point in an acquisition period which is used as a dominant oscillation mode period when the direct drive wind farm fails, and then to obtain a corresponding instantaneous value of each oscillation component of said each direct drive wind turbine generator;

a coupling energy transfer path acquisition module, configured to obtain an energy flow of a coupling energy transfer path of the direct drive wind farm in each acquisition period based on the corresponding instantaneous value of each oscillation component collected in said each acquisition period;

a key energy transfer path tracking module, configured to track a key energy transfer path of the direct drive wind farm according to the energy flow of the coupling energy transfer path of the direct drive wind farm in said each acquisition period, so as to realize stability control of the direct drive wind farm.

10. The system according to claim 9, wherein the coupling energy transfer path acquisition module obtains the energy flow of the coupling energy transfer path between subsystems of the direct drive wind farm in said each acquisition period through the following ways:

based on the corresponding instantaneous value of each oscillation component collected in said each acquisition period, a dynamic mathematical model of each subsystem of said each direct drive wind turbine generator in said each acquisition period is established, wherein the subsystems include current loop d, q axis subsystems, grid-connected line d, q axis subsystems, DC voltage outer loop subsystem and phase-locked loop subsystem;

according to the dynamic mathematical model of each subsystem of said each direct drive wind turbine generator in said each acquisition period, a dynamic coupling energy derivative of each subsystem of said each direct drive wind turbine generator is obtained, and the dynamic coupling energy derivative of said each direct drive wind turbine generator in said each acquisition period is obtained;

a value corresponding to the dynamic coupling energy derivative of said each direct drive wind turbine generator in said each acquisition period is used as an energy flow of a dynamic coupling energy transfer path of said each direct drive wind turbine generator in said each acquisition period;

the energy flow of the dynamic coupling energy transfer path of said each direct drive wind turbine generator in said each acquisition period is divided to obtain an energy flow of a generator internal coupling path, a generator-generator coupling path and a generator-grid coupling path, then the energy flow of the generator internal coupling path, the generator-generator coupling path and the generator-grid coupling path is divided respectively to obtain an energy flow of each coupling energy transfer path of the direct drive wind farm in said each acquisition period.

* * * * *